United States Patent [19]
Fritz et al.

[11] Patent Number: 6,134,552
[45] Date of Patent: Oct. 17, 2000

[54] KNOWLEDGE PROVIDER WITH LOGICAL HYPERLINKS

[75] Inventors: Franz-Joseph Fritz, Mannheim; Norbert Schroeder, Weinheim, both of Germany

[73] Assignee: SAP Aktiengesellschaft, Walldorf, Germany

[21] Appl. No.: 09/014,538

[22] Filed: Jan. 28, 1998

Related U.S. Application Data

[60] Provisional application No. 60/061,316, Oct. 7, 1997.

[51] Int. Cl.[7] .................................................... G06F 17/30
[52] U.S. Cl. .............................. 707/10; 707/1; 707/100; 707/102; 707/103; 707/104; 707/200; 707/203; 707/501; 707/513; 707/514; 709/203
[58] Field of Search .............................. 707/10, 100, 101, 707/1, 102, 103, 104, 200, 203, 501, 513, 514; 709/203

[56] References Cited

U.S. PATENT DOCUMENTS

| | | | |
|---|---|---|---|
| 5,008,853 | 4/1991 | Bly et al. | 345/331 |
| 5,220,657 | 6/1993 | Bly et al. | 711/152 |

FOREIGN PATENT DOCUMENTS

| | | | |
|---|---|---|---|
| 0319232 | 6/1989 | European Pat. Off. . | |

OTHER PUBLICATIONS

V. Christophides and A. Rizk, "Querying Structured Documents with Hypertext Links using OODMS", Proceedings of the 1994 ACM European conference on Hypermedia technology, pp. 186–197, 1994.

*Primary Examiner*—John Breene
*Assistant Examiner*—Cheryl Lewis
*Attorney, Agent, or Firm*—Chadbourne & Parke LLP

[57] ABSTRACT

A system and method is described for the efficient management and storage of documents in a multi-user environment by implementing a three-tiered content model for storage and a context resolution mechanism for retrieval. Source objects may logically reference target objects where the target objects dynamically exist in different versions. In particular, the content model contains three classes in a collection wherein each subsequent class inherits the properties of the previous class. The classes comprise logical objects, physical objects, and components. All physical objects that belong to the same logical object are context specific variants, such as different versions of each other. Physical objects in a collection can be related by different criteria, as well as by user-defined relations. The system provides for versioning of objects, such as variations based on content, format, language, etc., to create variants of objects in the same collection, however variance among physical objects which belong to one logical object is not limited to different versions. Such versioning is controlled through a check-in/-out mechanism to allow use in a multi-user environment. The context resolution mechanism is used to retrieve the most accurate version of an object pursuant to certain user-supplied criteria in response to a call from a client front-end application. The system is linked to various independent front-end editor/browser applications through application programming interfaces. The system also provides for references between various objects in the Knowledge Provider. A dynamic logical hyperlink mechanism is provided to maintain references from source to target objects while a different version of the target object is being created.

30 Claims, 35 Drawing Sheets

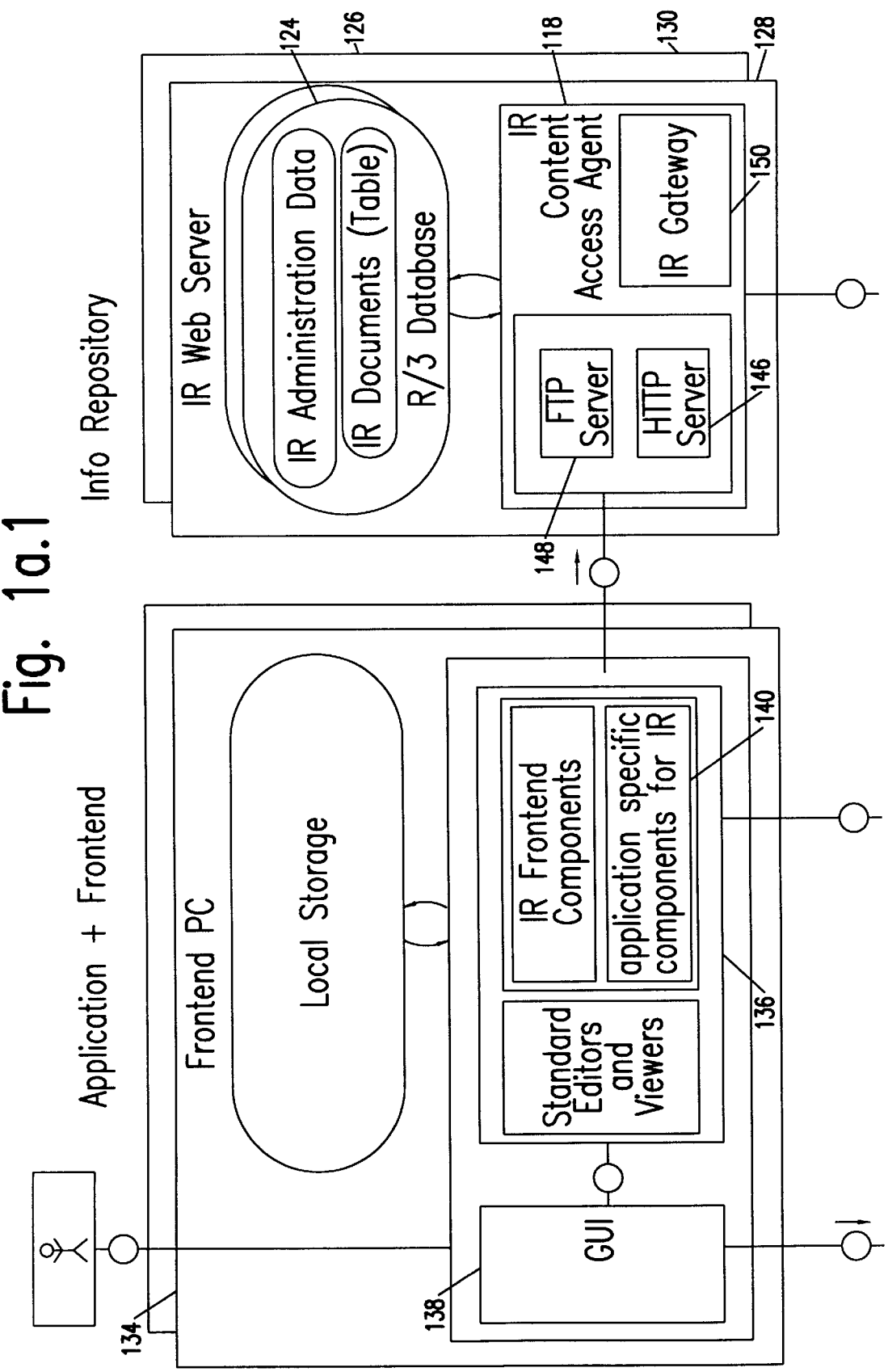
Fig. 1a.1

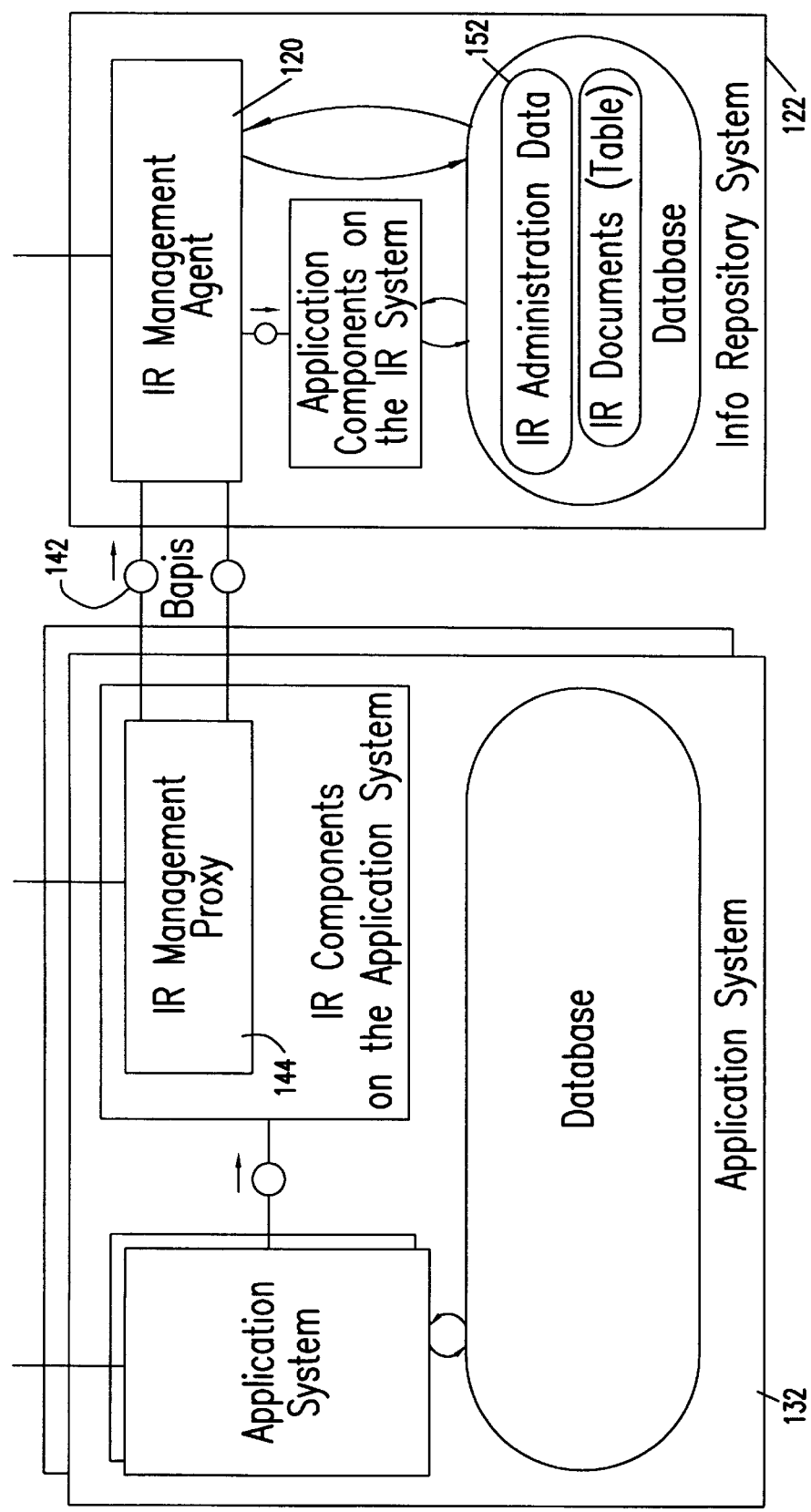
Fig. 1a.2

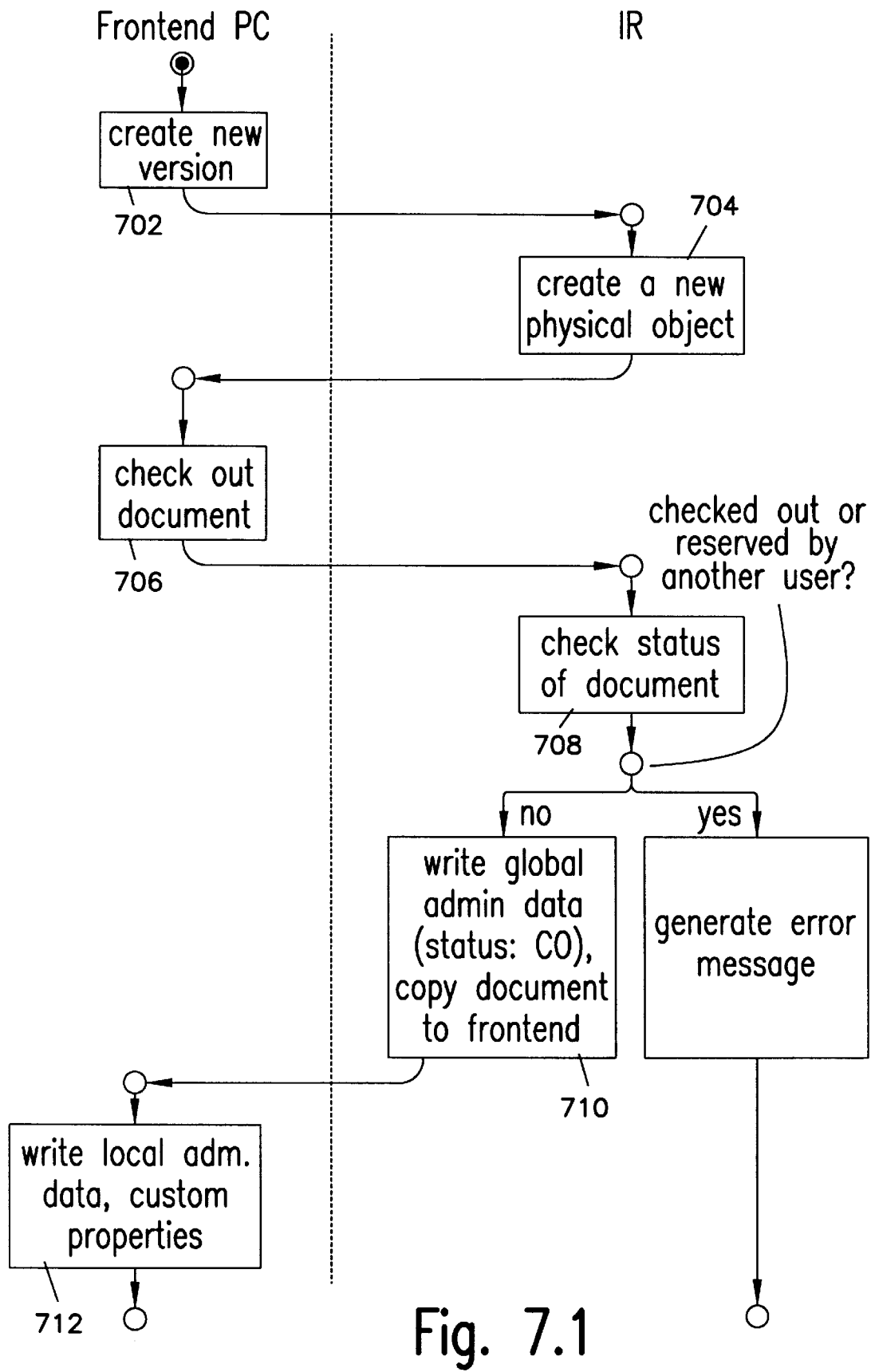
Fig. 7.1

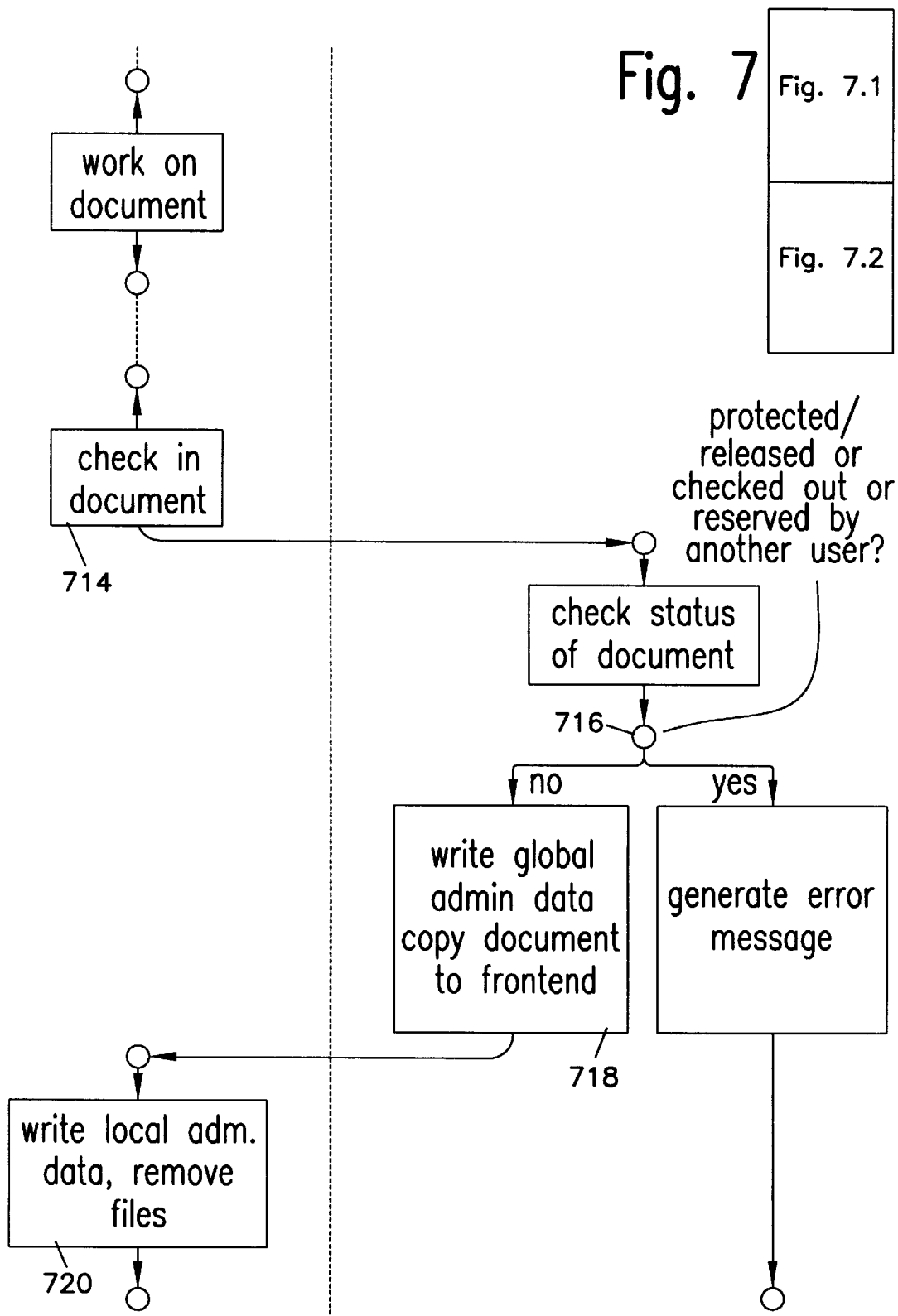
Fig. 7.2

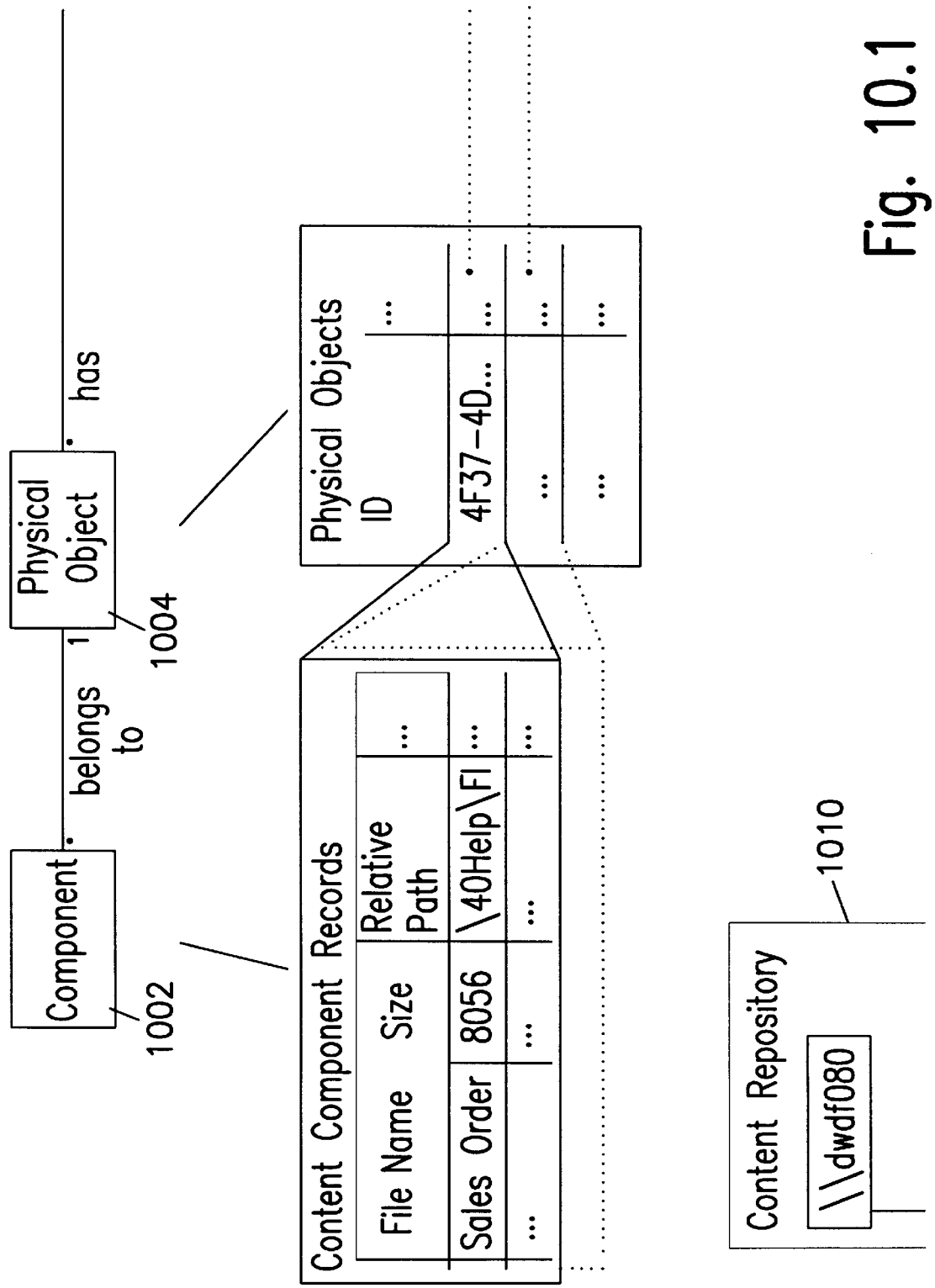
Fig. 10.1

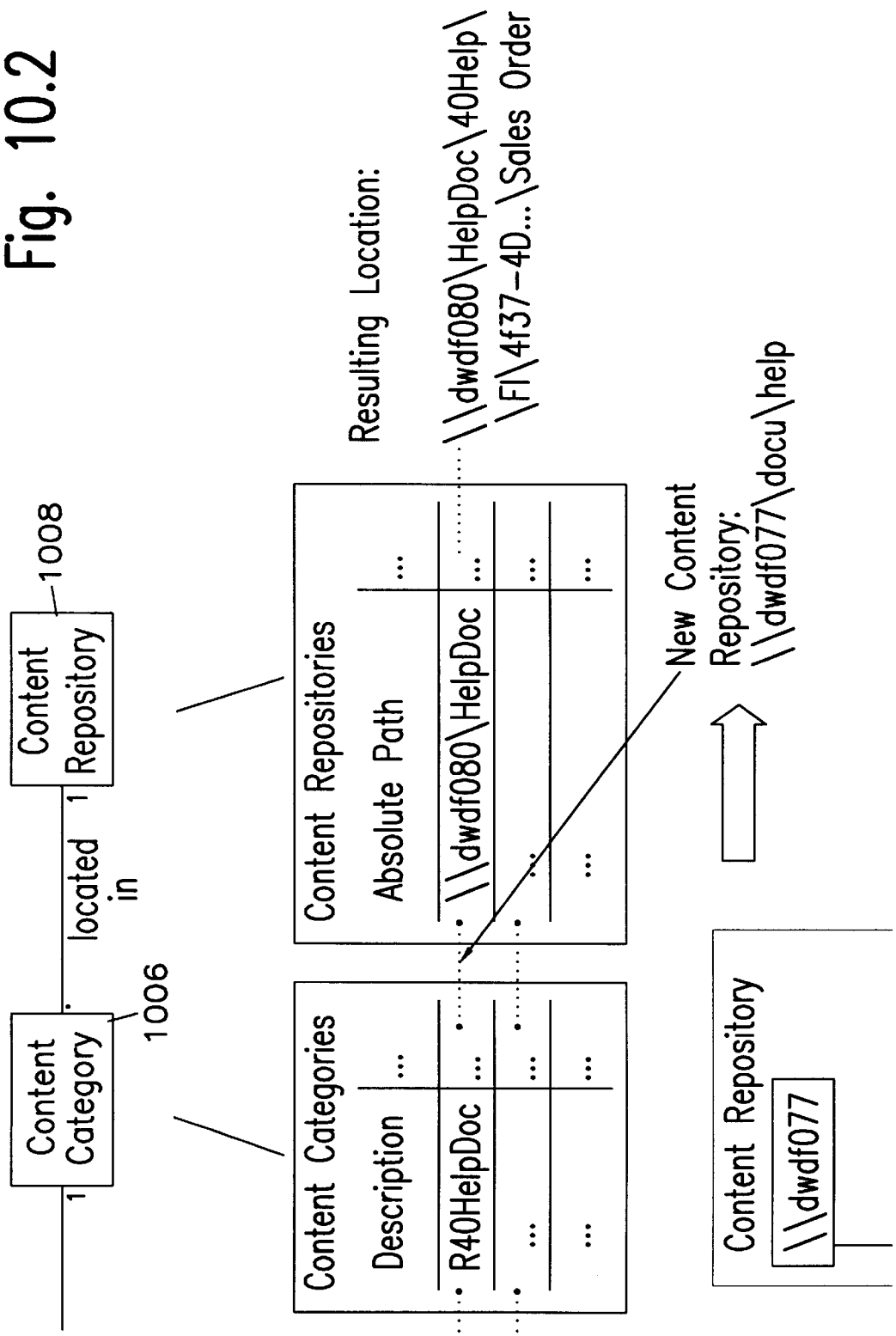
Fig. 10.2

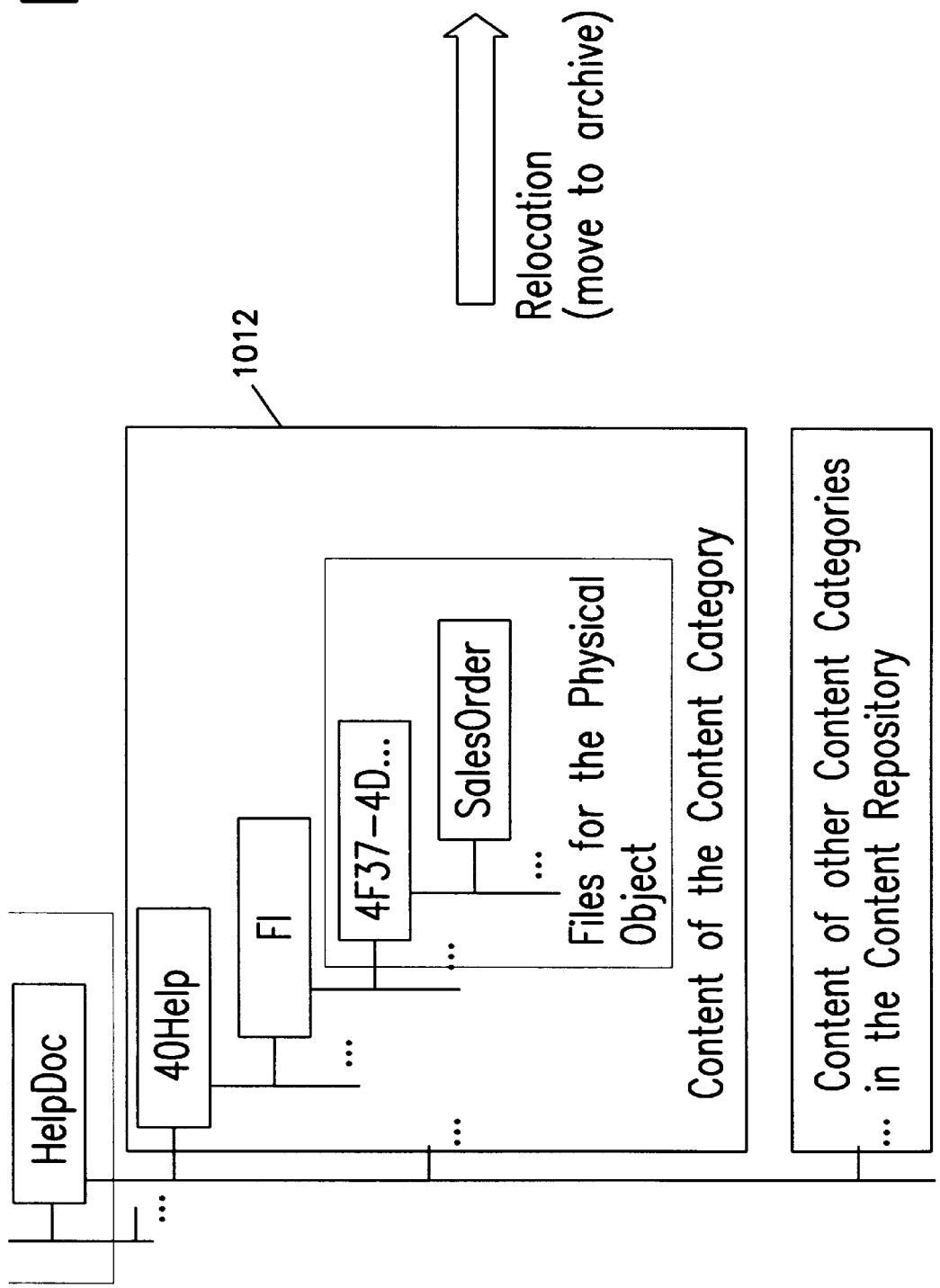
Fig. 10.3

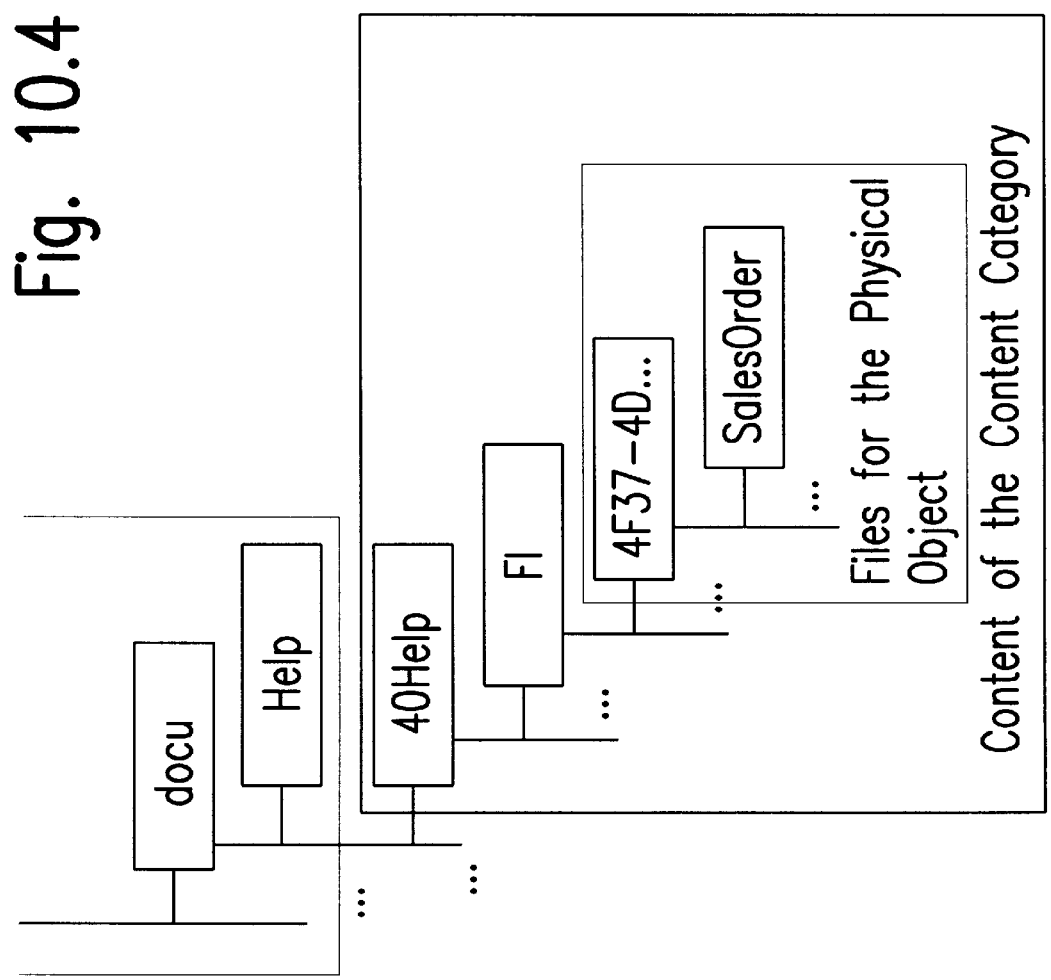

| Relationship Type | Existential Dependence | Transport | Remarks |
|---|---|---|---|
| independent | independent | independent | — |
| incoming | from destination | with destination | — |
| outgoing | from source | with source | — |
| hyperlink | from source | with source | additional descriptive text |
| class-object | independent | independent | for relations between an information class and an information object |

Fig. 15

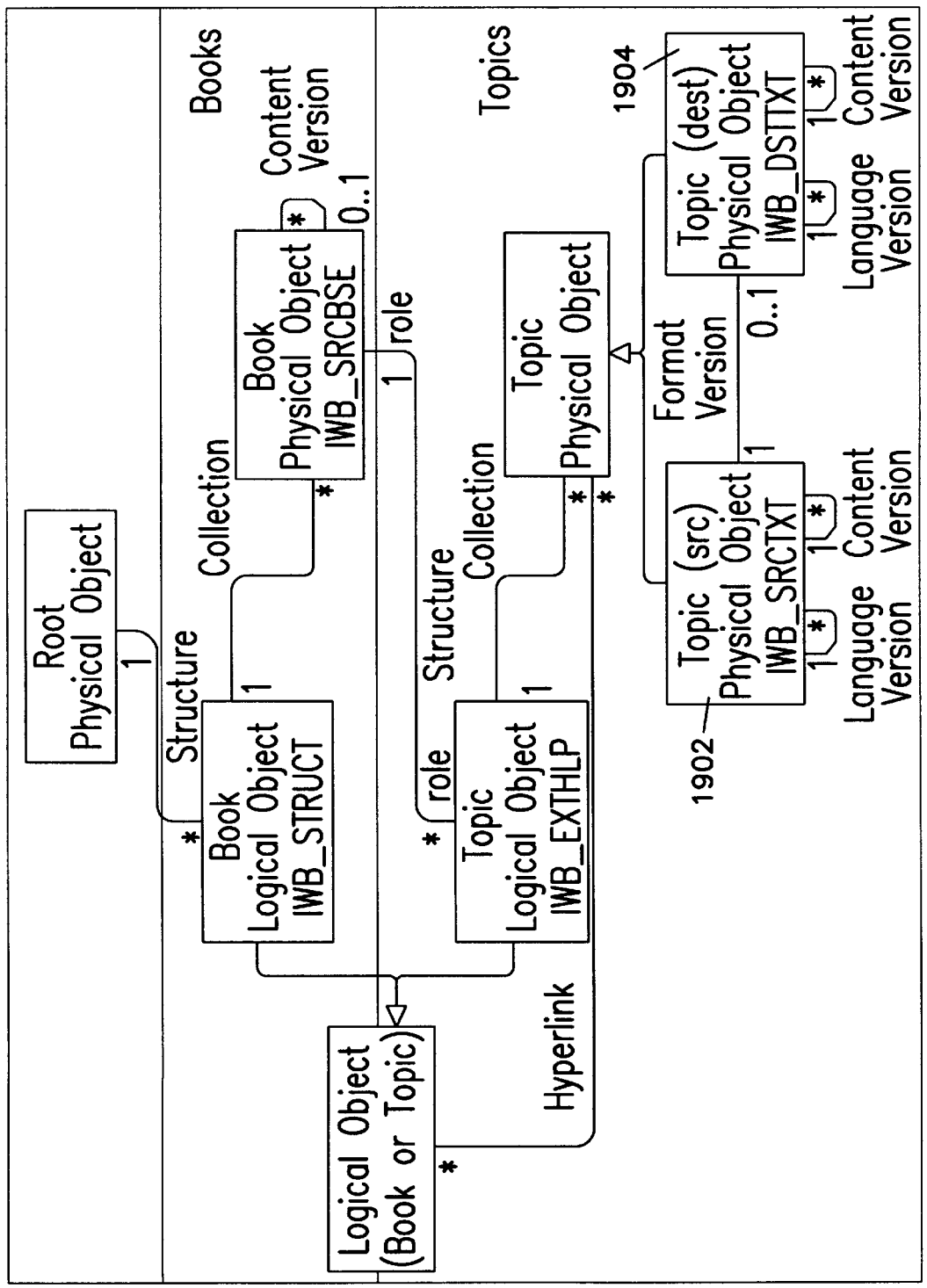

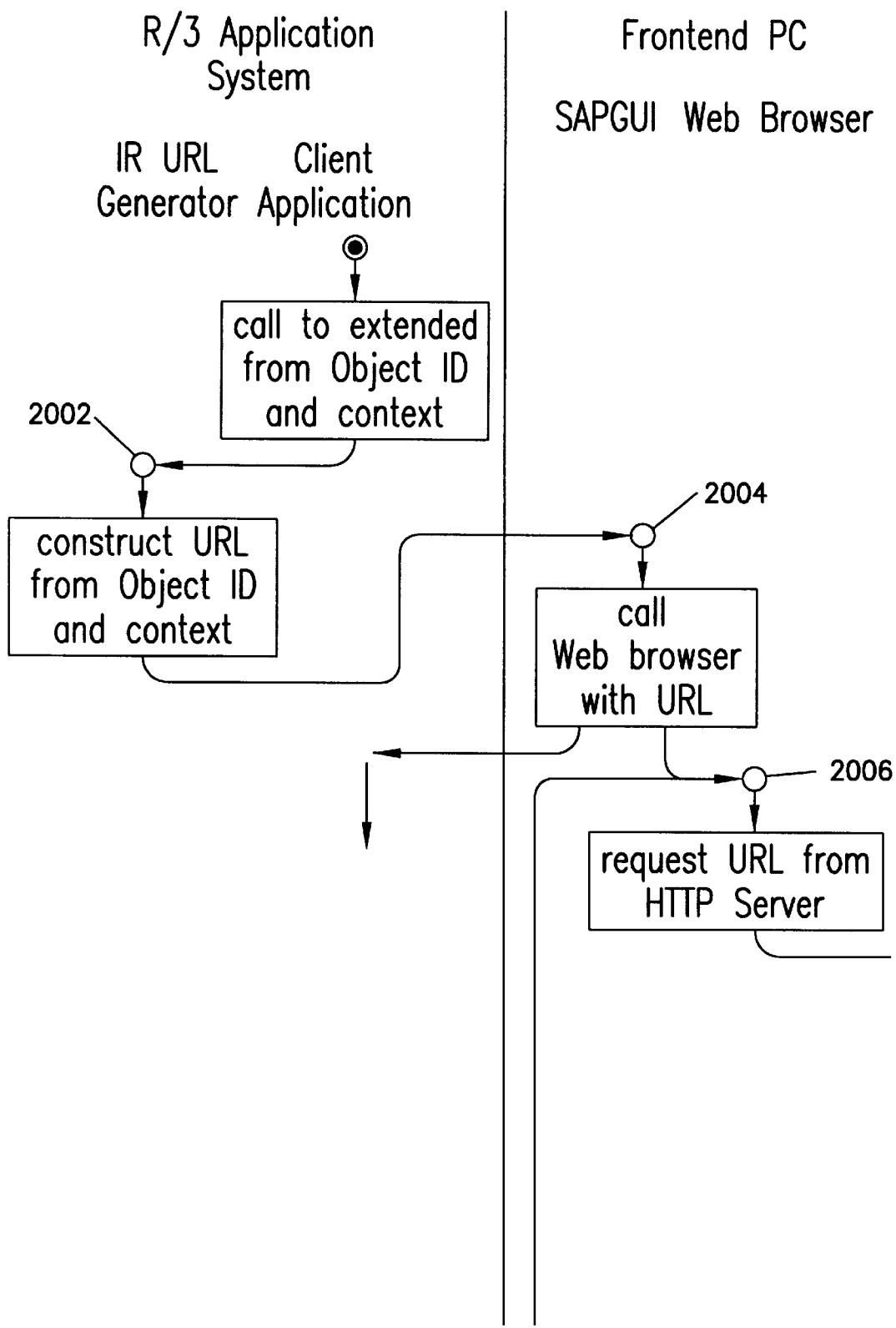
Fig. 20.1

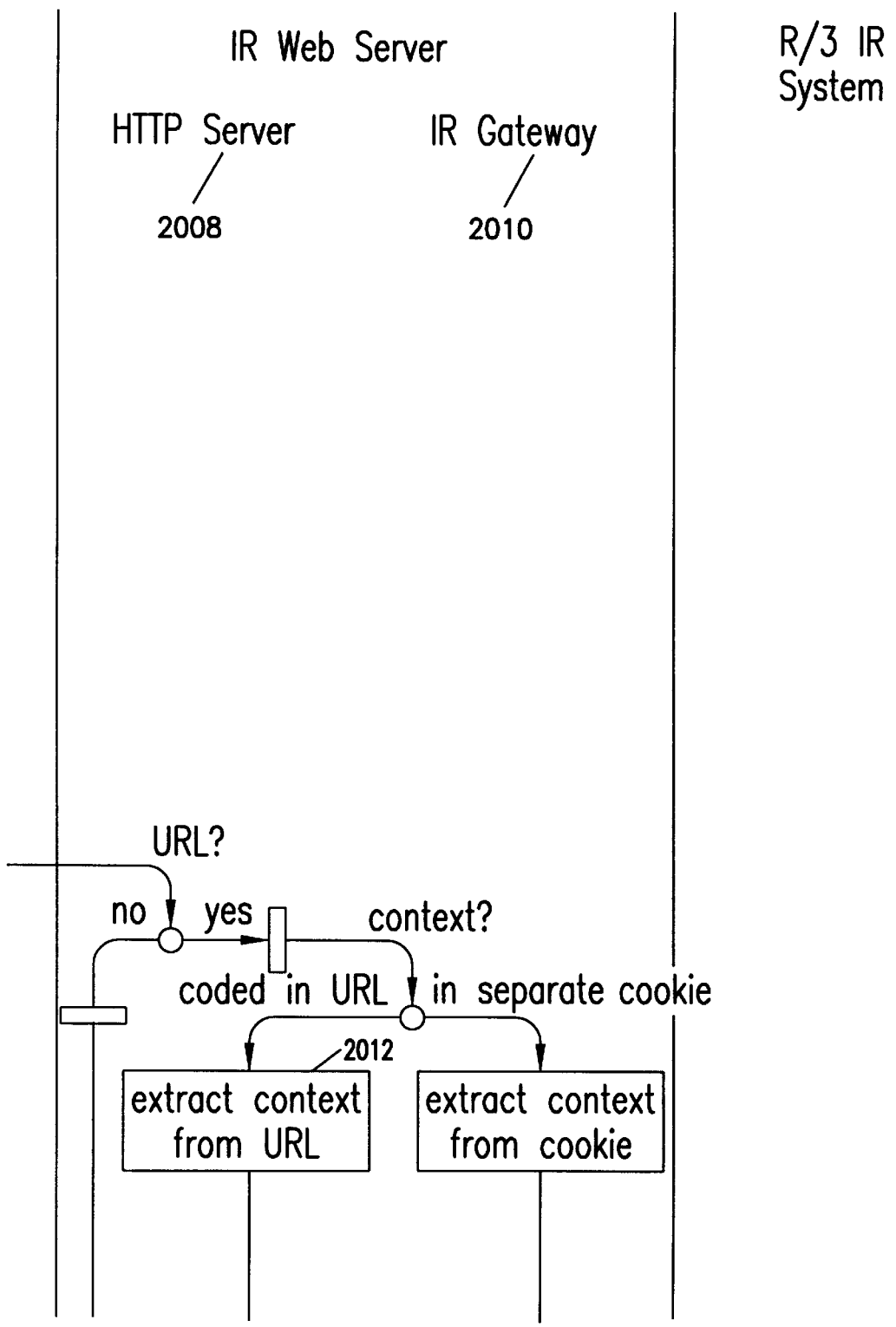
Fig. 20.2

Fig. 20.3

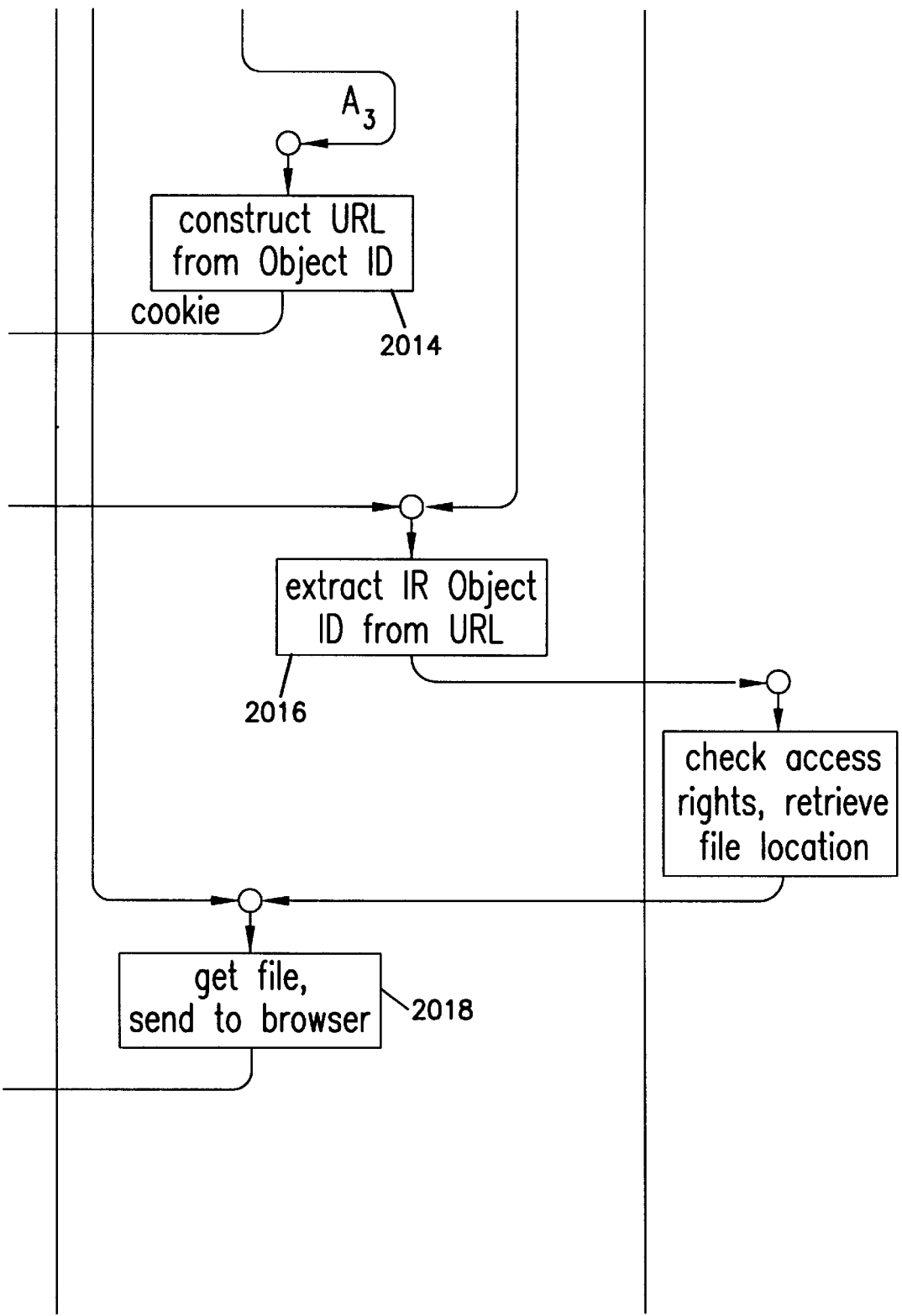
Fig. 20.4

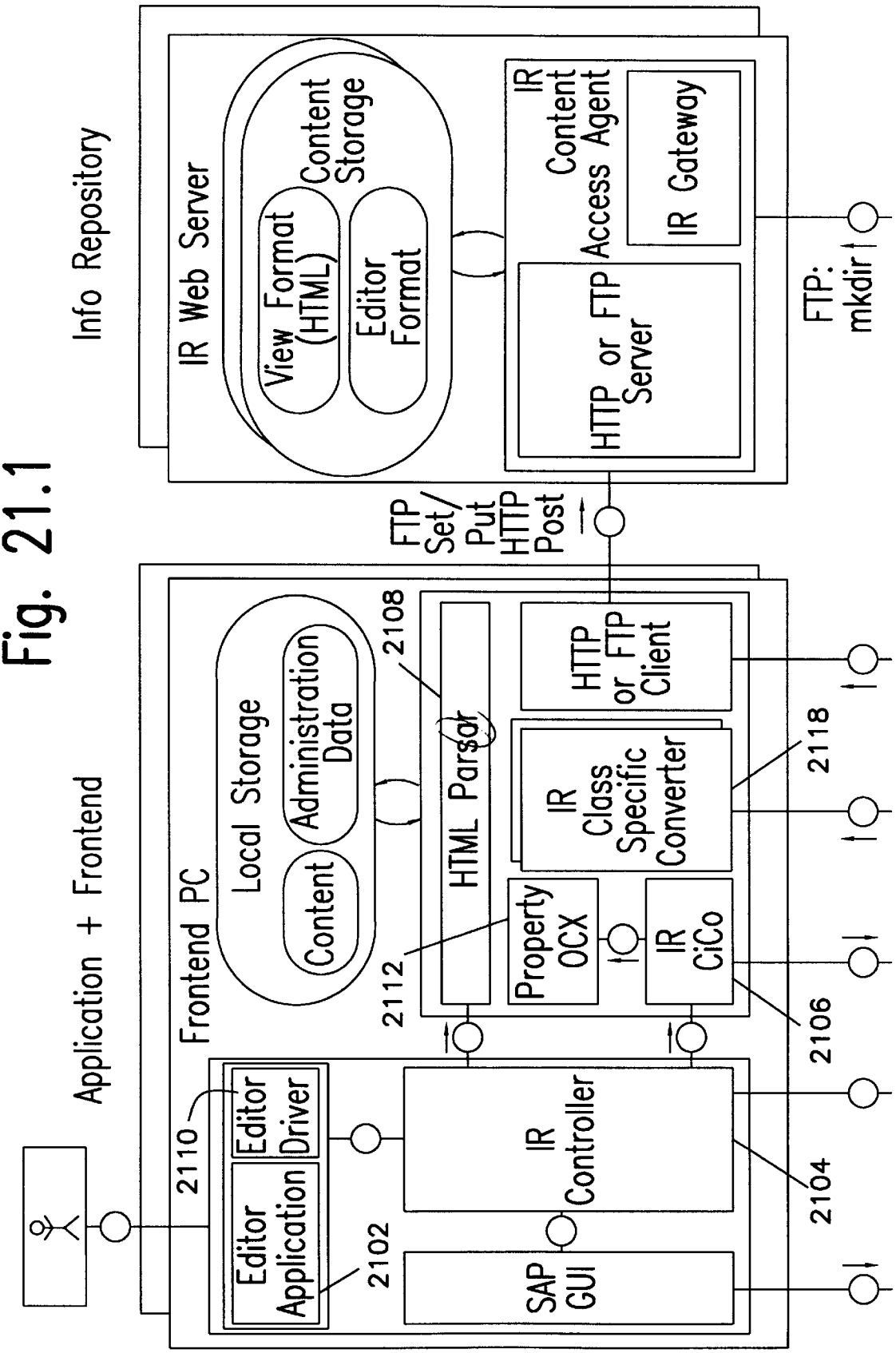
Fig. 21.1

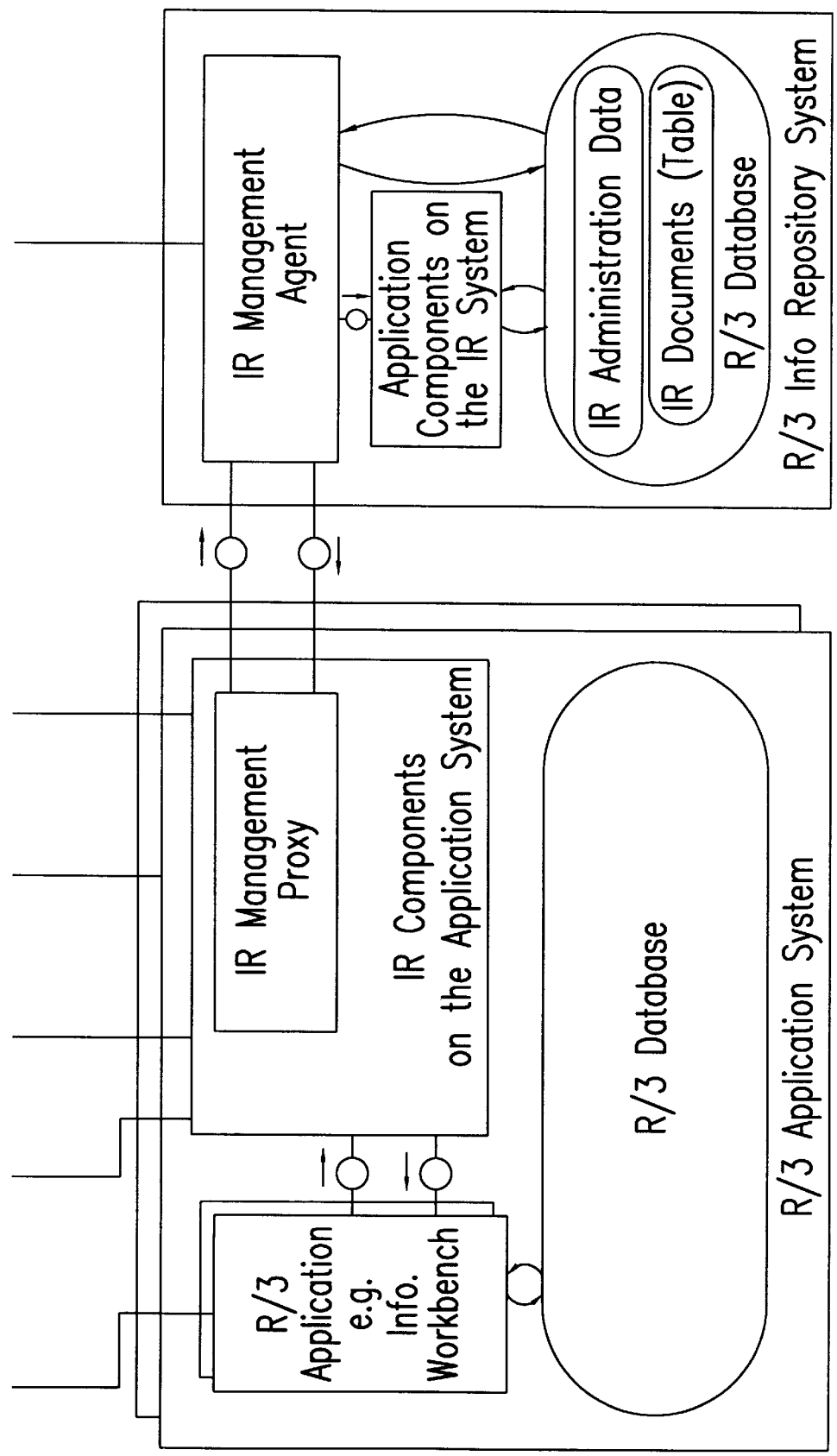
Fig. 21.2

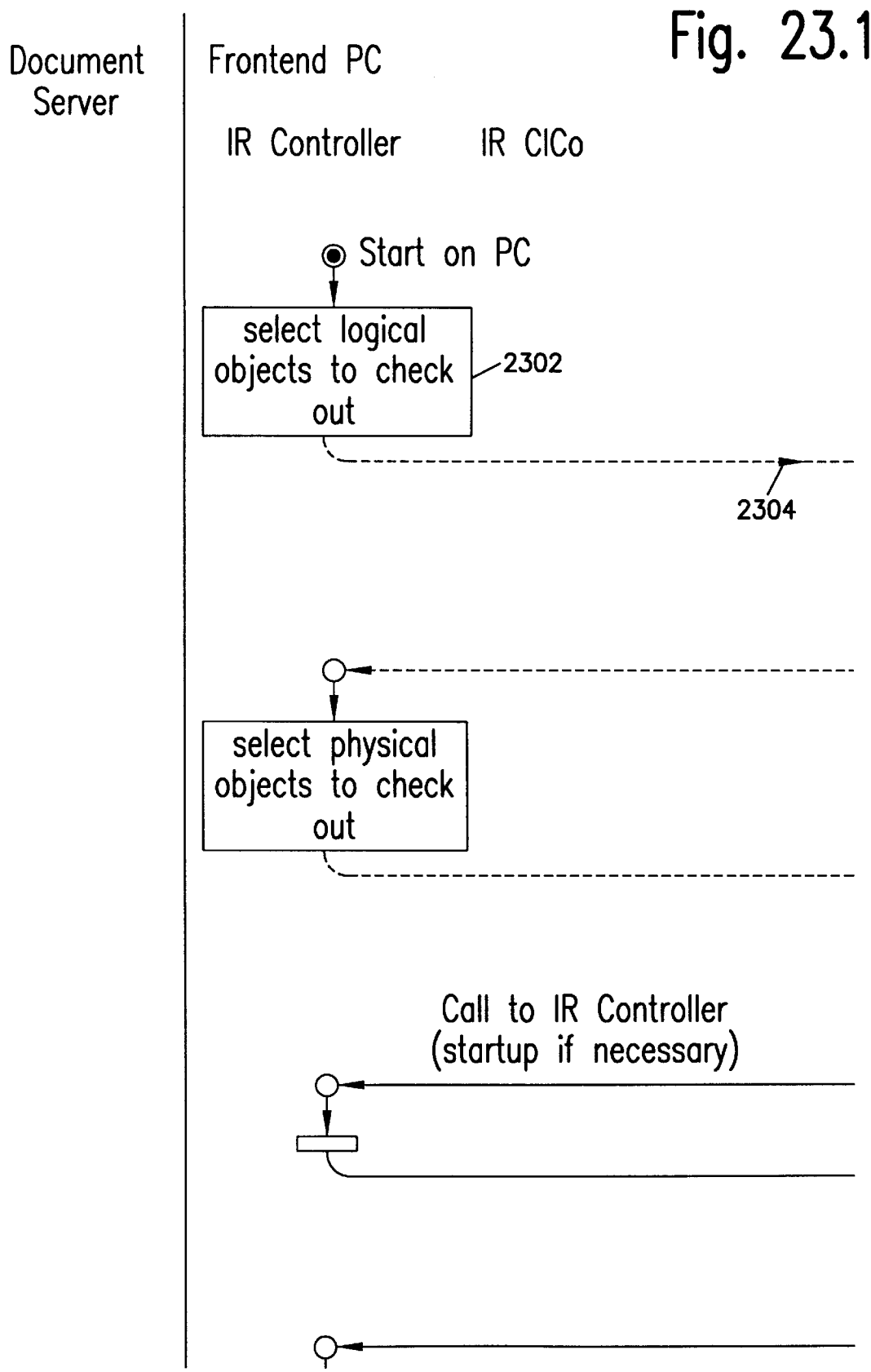
Fig. 23.1

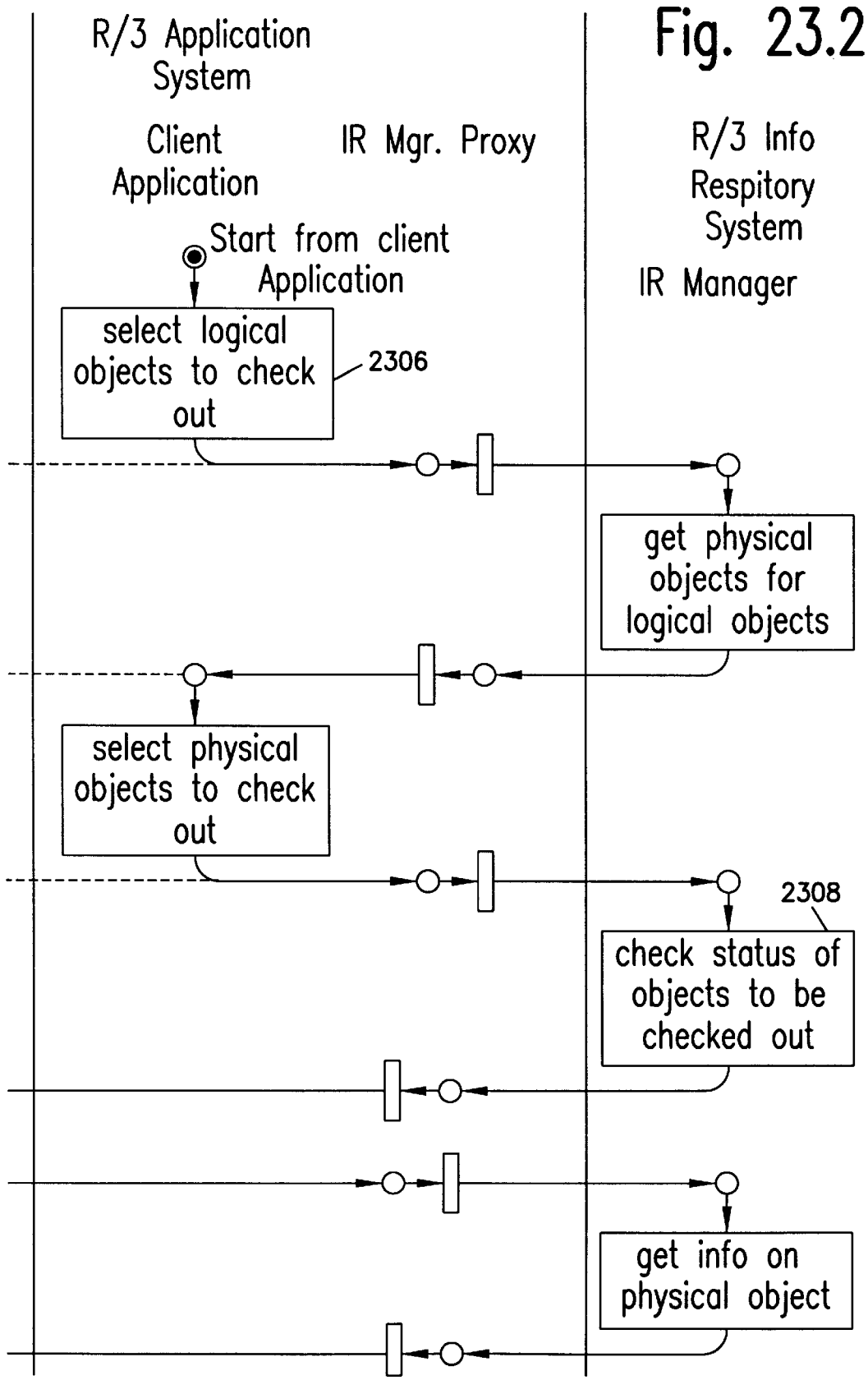
Fig. 23.2

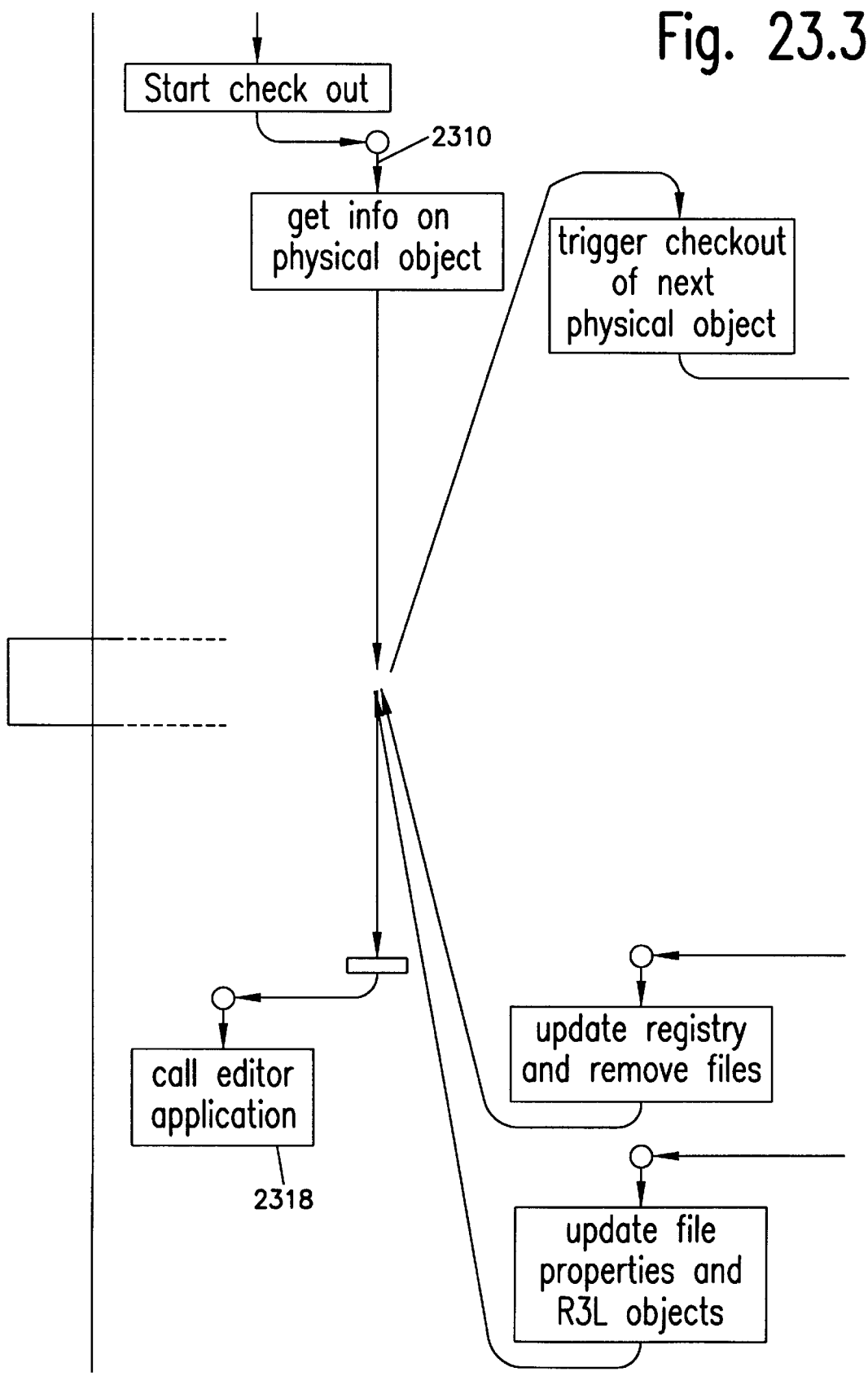
Fig. 23.3

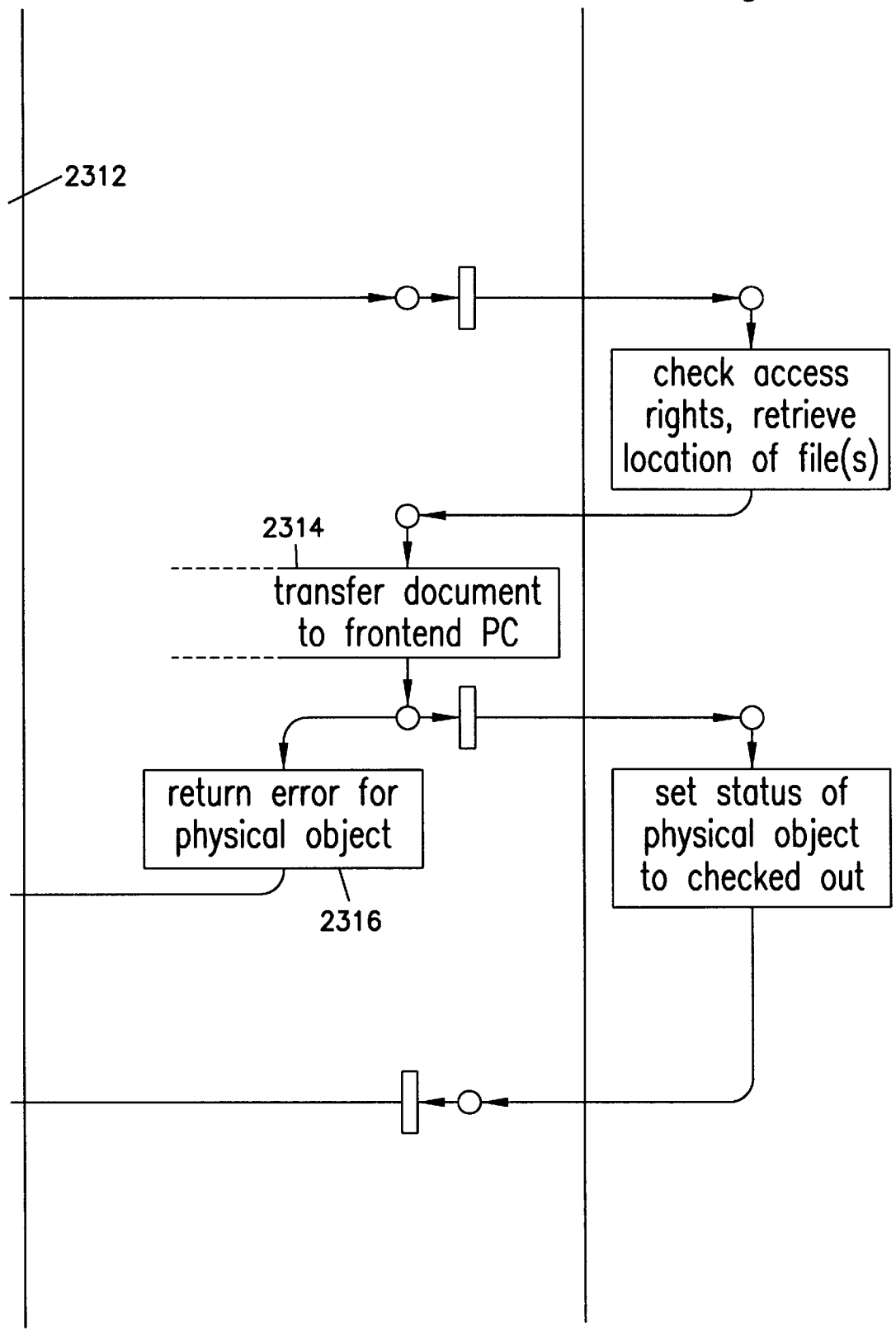
Fig. 23.4

KNOWLEDGE PROVIDER WITH LOGICAL HYPERLINKS

Applicant hereby claims the benefit of the earlier filing date of Provisional Patent Application Ser. No. 60/061,316 entitled "Information Repositor with Logical Hyperlinks", filed Oct. 7, 1997, pursuant to 35 U.S.C. §119(e).

FIELD OF THE INVENTION

The present invention relates generally to object management and storage systems and more particularly to techniques for the creation and management of multiple versions and context variants of objects within larger collections of related objects as well as techniques for dynamic resolution of links between the objects and accurate version retrieval based on specified criteria.

BACKGROUND OF THE INVENTION

An object management system can be defined as a system used to manage objects which are to be accessed, viewed, or edited in a multi-user environment. An object, in this context, can be defined as any file which is created, edited, or viewed by a user. Objects include file formats such as text, graphics, binary, audio, etc. A first user creates the original file, and subsequently, multiple users view or edit the file. In the past, it has been difficult to manage large numbers of documents that are simultaneously being edited by various users and always retrieve the most accurate or recent version of the document. If two users have the right to edit the same document and both transfer the document to their front end editing applications, work on it simultaneously, and then transfer different versions of the document back into the storage system, one of the users will overwrite the changes of the other. The present invention utilizes versioning processes and a check-in/-out mechanism to prevent this scenario from arising.

Furthermore, in the past new versions of documents usually create problems for sources that refer to them. A source document contains a reference, or link, to a target document. When a source refers to a particular target, and the target has been modified in a newer version of the target, the source would ideally now refer to the newest version of the target. The reference somehow has to be changed to point to the new version. If there are multiple references to the older version of the document, all references must be modified. The links do not necessarily have to be in source documents in the traditional sense, but can also be in any type of object, particularly business objects.

This problem is evident in hypertext documents in document publishing on the World Wide Web. Documents on the Web are written in Hypertext Markup Language. It is common for a hypertext document to contain links, known as hyperlinks, to other hypertext documents. When the source hypertext document contains a hyperlink to a target hypertext document, that hyperlink has to be modified if a new version of the target hypertext document has been created. If the target hypertext document has been moved to another location in the storage system, the hyperlink must again be modified.

This problem has been resolved in the past by simply allowing the new version of the target document to assume the identity of the original target document, such that the references would not have to be changed. However, this approach has problems. For example, if a French source document refers to an English target document before a French version of the target document became available, when a French version does become available, it simply cannot be allowed to overwrite the English version of the target document because there may be other English source documents that are referring to the English version of the target document.

It is desirable to be able to create new version of documents while maintaining the original version. Often, the modification or editing of a version of a document is not necessarily a correction, implying an overwrite of the original document. For example, new versions may simply be changes in terms of format, language, etc.

SUMMARY OF THE INVENTION

The invention relates to a computer system for managing and storing objects comprising a storage mechanism such as a database, an optical archive a Web-based document server, a management agent, an administration data table, and a client front-end editor/browser application. Objects are defined as any type of file or document in any format. Examples of objects are text, binary files, graphics, etc. The invention manages objects having various versions by using a three-tiered content model.

The model consists of components, physical objects, and logical objects. Multiple physical objects belong to one logical object, while the physical object itself represents an individual document. The logical object is the upper most tier, describing the object in its most generic terms. The logical object is also referred to as a collection. Any number of physical objects, i.e. objects which are meta-descriptions of the different binary objects that actually exist at any time, may belong to a logical object. A physical object describes a particular version that belongs to exactly one logical object which represents the general meaning of the subject matter described. The physical object contains references to the components, which contain the administration data associated with the files and pointers to said files.

The system provides a control mechanism to prevent the simultaneous editing of an object by multiple users. The check-in/-out mechanism allows the object management system to maintain data accuracy in a large, multi-user environment. When an object has been checked out, the management agent will set up a lock for the original physical object within the administration data table that will prevent other users from accessing the object with the intent of changing it or transferring a new version into the Knowledge Provider. When a first user has checked out a document and a second user tries to check out the same document, the management agent will consult the check-out information and refuse the request.

The system also comprises a context resolution mechanism which, upon request for a logical object, allows for the retrieval of the most appropriate physical object associated with that logical object on the basis of the context, the correlation between the user's current language, format, etc. The context resolution is performed on the basis of the attributes of the physical objects encapsulated by a particular logical object as well as the attributes of the user's client application. In addition, the process of context sensitive selection can be augmented by application specific rules and information. Each physical object associated with a particular object has different attributes, i.e. language, format, etc. Context resolution compares the attributes of each physical object with the attributes of the user's front-end client application.

The system further comprises a logical hyperlink mechanism which provides for references between various objects in the system. In a preferred embodiment, a Web-based document server is the storage mechanism and various objects are referenced via hyperlinks. This mechanism uses "soft" or logical hyperlinks which allow context-depending selection of target documents at run-time and do not refer to a specific object at a specific location. The logical hyperlink references a Global Unique Identifier (GUID) of the logical object and the identifier of the executable program. The attributes required to select the proper physical object are not generated until runtime. In this way, the logical hyperlink is in essence a type of "late binding" which shields the client application from the back-end mechanisms which are being implemented. When a source object references a target object, and a newer version of the target object has been created, the logical hyperlink mechanism will dynamically reference the newest version of the target object.

The storage and management system is integrated with various client applications through business application programming interfaces (BAPI's). The client applications can retrieve physical objects from the system by sending requests which are returned by the system back to the client application.

It is an object of the present invention to provide a method for the management of objects such that different versions of the same object can be created and managed.

It is a further object of the invention to provide a mechanism for the versioning of objects.

It is a further object of the invention to construct relations between objects in the system based on different established criteria as well as user-defined criteria.

It is a further object of the invention to provide a management and storage system which can be integrated with a variety of front-end editor/browser applications.

It is a further object of the invention to provide a method for establishing and maintaining links and references between various objects while objects are being dynamically versioned.

It is a further object of the invention to provide for the accurate retrieval of particular versions of an object in response to a call from a front-end client application.

It is a further object of the invention to provide multiple users with access to the same objects without compromising the accuracy of the objects.

BRIEF DESCRIPTION OF THE DRAWINGS

FIG. 1A provides a more detailed view of the Knowledge Provider.

FIG. 7 is a flowchart of check-out/-in with strict versioning.

FIG. 10 illustrates the method of management of file locations in the IR system.

FIG. 15 is a chart of relationship types.

FIG. 19. illustrates an application specific content model which is based on the three-tiered content model

FIG. 21 shows the components necessary for an editing scenario.

FIG. 23 is a flowchart illustrating the communication of components in a check-out/edit scenario.

BRIEF DESCRIPTION OF THE PREFERRED EMBODIMENT

In its preferred embodiment, as described below, the Information Repository (IR) facilitates the management of large quantities of documents and other content with similar access characteristics in a dynamic, multinational, multi-user environment. The Knowledge Provider of IR is the basic functional document management module which can be accessed by various client applications. The invention is robust and flexible enough to support virtually any type of front-end client application through a series of application programming interfaces. The IR includes integrated World Wide Web (Web) publishing functionality. Content can be retrieved via the Hypertext Transfer Protocol (HTTP) by any kind of HTTP client. Content can be accessed and viewed with nothing more than a standard Web browser acting as the client application. Critical to the IR management system is the means for logical hyperlinking. These hyperlinks are resolved indirectly via the IR rather than being resolved directly by, in this case, the Web server. When following a logical hyperlink, the IR performs a context resolution. The hyperlink that points to a logical destination is resolved to a physical destination depending on current language, format, content version, and various other user-defined client application specific parameters. The IR of the present embodiment also includes an authoring environment, which is used to edit the content of the IR and maintain relations between the physical objects. Check-in/-out management provides locking mechanisms and facilitates document editing through the maintenance of administrative information in the documents themselves. The IR content is stored on a Web server in a HTTP archive. Documents in the IR are identified by Globally Unique Identifiers (GUIDs) that are standardized and can be generated off-line and independent of the IR. Client applications can independently generate IDs for objects to be stored in the IR before having access to the IR, thereby facilitating migration of content.

DETAILED DESCRIPTION OF THE PREFERRED EMBODIMENT

Figure 1:
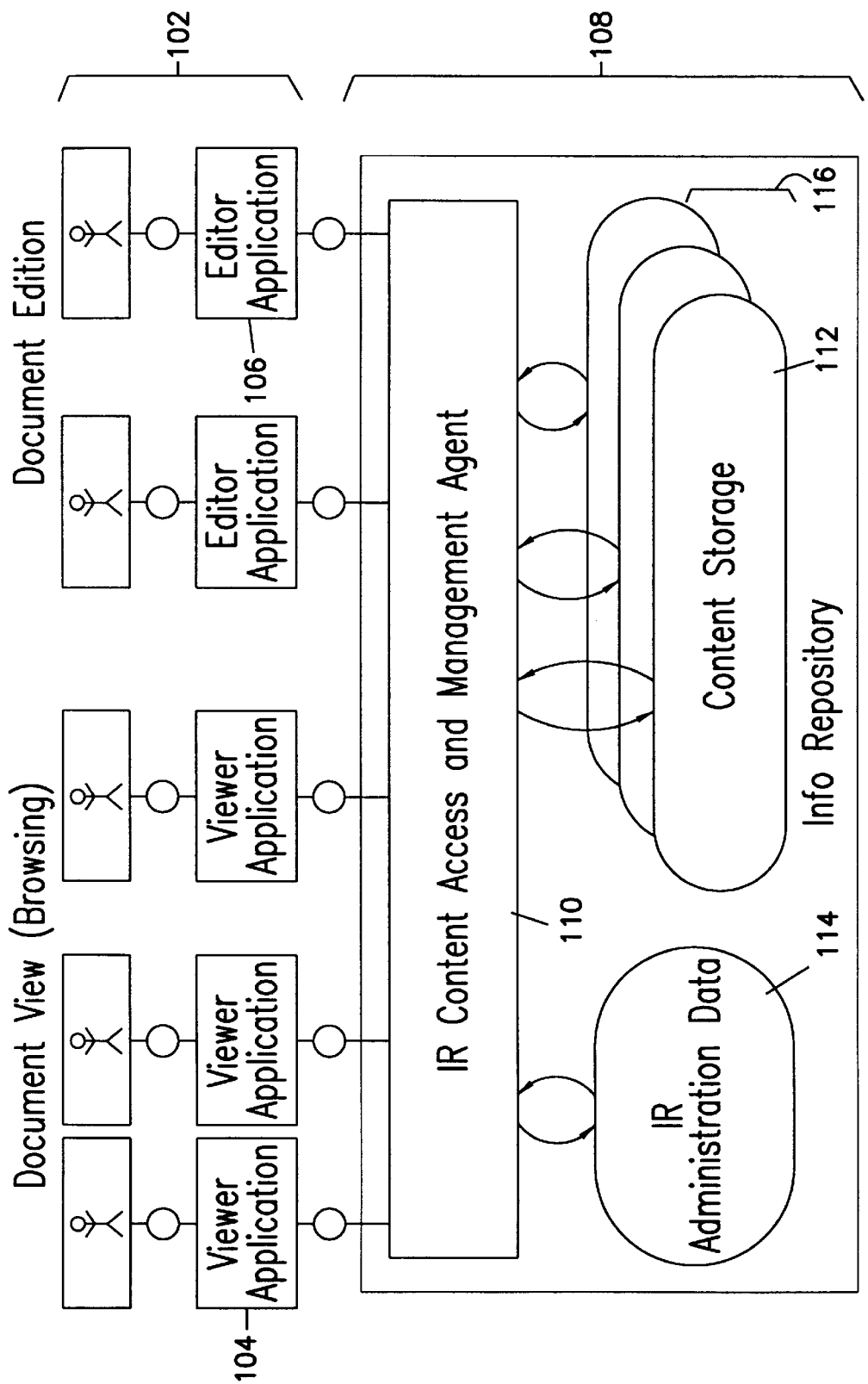
FIG. 1 provides an overview of the Knowledge Provider.

FIG. 1 gives a general overview of the Knowledge Provider concept. Viewer and editor applications 102 illustrates two user scenarios. The user can either view content through viewer client application 104 or edit content with editor client application 106. The viewer application is typically a Web browser, but other viewer applications may also be utilized. IR 108 itself comprises IR Content Access and Management Agent 110, which reads and writes content to and from content storage 112 upon user requests in conformity with the settings within administration data 114. As can be seen from the illustration, the administration data is clearly separated from the content. The content may be distributed among multiple storages 116, whereas the administration data is kept in one single central storage. This approach provides both a central access management and scalability at the same time.

FIG. 1A gives a more detailed view of the implementation structure and shows a client application that makes use of the IR. The main components of the IR are depicted on the right hand side of FIG. 1A. IR Content Access Agent 118 and IR Management Agent 120 together function as IR Content Access and Management Agent 110 from FIG. 1. IR Administration Data 152 is located on IR system 122 together with IR Management Agent 120 while multiple content storages 124, 126 may be located on each IR Web Server 128, 130. Note that content storages do not have to be on IR Web Server 128. In an alternate embodiment not depicted in FIG. 1A, content storages 124, 126 can be part of a document content server.

On the left hand side of FIG. 1A, application system 132 on which the application resides makes use of the IR system (in this case, depicted as the R/3 System from SAP AG, Walldorf, Germany) is depicted. User's front-end PC 134 contains additional IR components 136 which are required for editing. In the example shown, the user communicates with application system 132 through Graphical User Interface (GUI) 138. For displaying IR documents, a Web browser is required. For editing purposes, standard components like Microsoft Word (MICROSOFT CORP., Redmond, Wash.) are used. In addition, specific IR front-end components 140 are required that act as a front-end user interface and are responsible for communication with the IR Manager. Both application system 132 and front-end components 136 communicate with IR Management Agent 120 through Business Application Programming Interfaces (BAPIs) 142, although any type of Application Programming Interface may be used (API). Alternatively, IR Management Agent 120 does not have to be located on the system on which the client application resides, and the BAPI calls are passed through IR Management Proxy 144. IR Web Server 128 acts as the primary access agent for content that is to be viewed, added, or modified.

Clients may access the IR Web Server through the standard protocols HTTP and/or File Transfer Protocol (FTP) through HTTP server 146 and FTP server 148 which reside on the Web server. Additionally, IR Web Server 128 may communicate with IR Management Agent 120 through IR Gateway 150. In this embodiment, clients pass logical content access information to IR Web Server 128, which resolves this information with the help of IR Management Agent 120 via IR Gateway 150 to physically access information that can be used to retrieve files from content storage. All data goes through IR Management Agent 120 for manageability and control. This process will be described in further detail below.

IR System 122 itself is where IR administration data 152 resides. The IR administration data contains information on the location of documents, their status, access rights, and the relations among documents.

Figure 2:
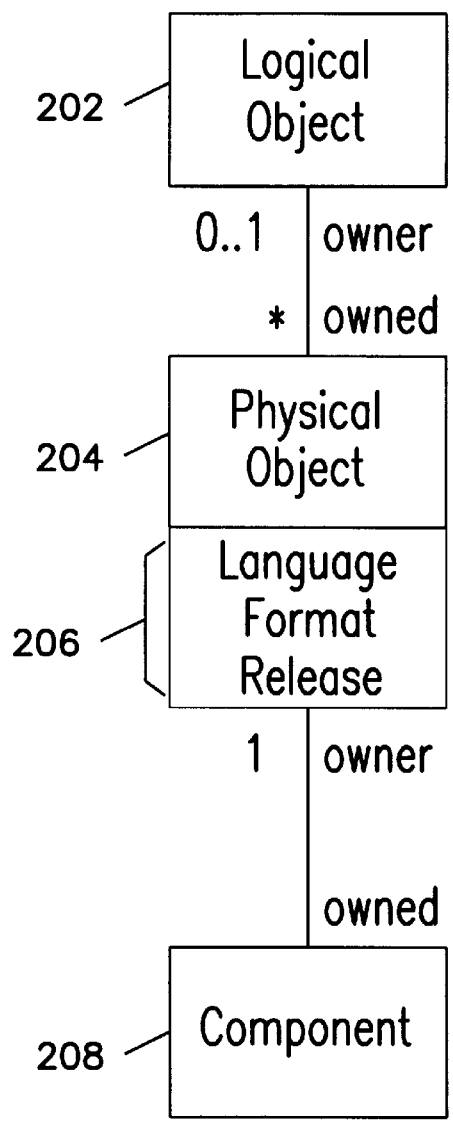
FIG. 2 is a depiction of the three-tiered IR content model.

Intrinsic to the IR management system is the three tiered IR content model depicted in FIG. 2. Logical object 202 is the upper most tier, describing the document-like binary object in its most generic terms. The actual content, the document or object itself, has additionally properties such as language, format or release. The document is written in a specific language (e.g., English) and created in a particular format (e.g., Word, PDF, HTML, etc.). These properties may be customized by the user to suit his or her particular needs and are not limited to the aforementioned. One particular property is what the document is logically about, i.e. it belongs to a collection. All the data that belongs to the same collection is managed through one logical object 202. Logical object 202 contains any number of physical objects 204, i.e. objects which are meta-descriptions of all the document-like binary object that exist in the same collection at any one time. The meta-information, or attributes, such as format and language 206, is generally automatically captured from the client editor application in which that object was created or can be generated by the IR itself, according to freely definable criteria. The physical object contains references, again transparent to the user, to the third tier, components which represent the individual files belonging to a single physical object.

Figure 3:
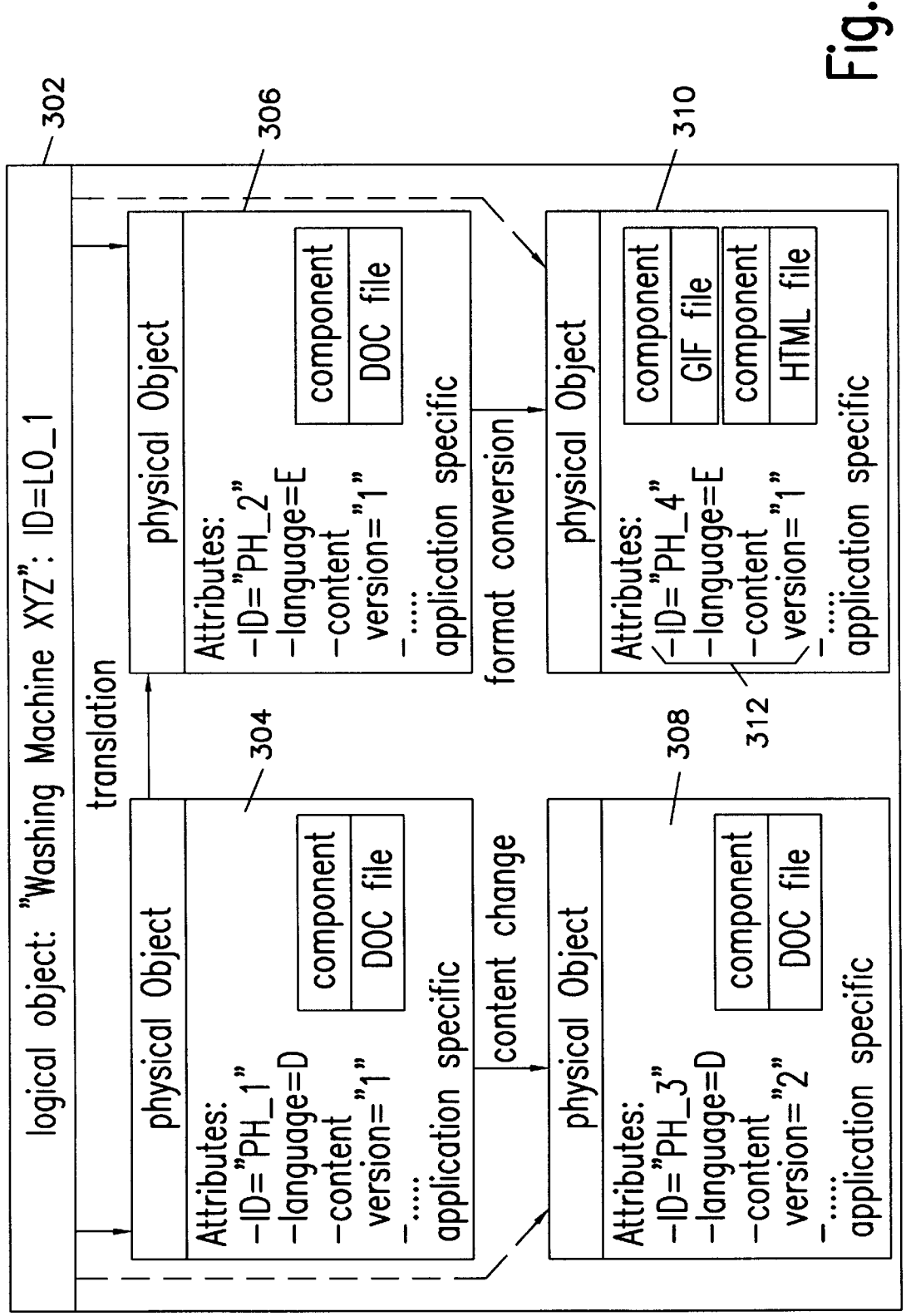
FIG. 3 is an illustrative example of the three-tiered IR content model.

To further understand the content model, FIG. 3 provides an illustrative example of the concepts being taught. The logical object "Washing Machine XYZ" 302 references four physical objects with the object identifiers "PH_1" 304, "PH_2" 306, "PH_3" 308, "PH_4" 310. While the physical objects "PH_1", "PH_2", and "PH_3" refer components associated with a .doc file (MS WORD), the physical object "PH_4" is built by two components, an HTML (Hypertext Markup Language) file and a GIF(Graphic Image Format) file. The physical objects as shown have three attributes 312, an ID number, language, and version. All different types of versions of physical objects are encapsulated in one logical object.

The three tiered content model is the key to the IR document management system, allowing the user to access the document he or she requires without having to be aware of details such as document age, format, location, or language.

As mentioned above, different versions and context variants and context variants of the same file may exist within the same collection or logical object. The present invention teaches a method of versioning within the IR document management system which will be described further. Generally, when a document is created, it may have to be modified. The new document which is derived from the original document through changing its content, can be regarded as a new revision of the original. The original becomes outdated by the new time the new revision is created, or the new version is established as a distinct piece of content. However, a new version of a document may be created when it is translated into German. In this case, the original does not become outdated—it is still a valid document. The new version would be considered a variant in this case. It is further possible to make multiple versions of the original document in a process called multiple versioning. In principle, an indefinite number of versions can be created from the original. Versioning criteria describe the way in which the new variant is created. Translation creates a language version of the original. Conversion from a DOC file to a HTML file creates a format version of the original, etc.

Figure 4:
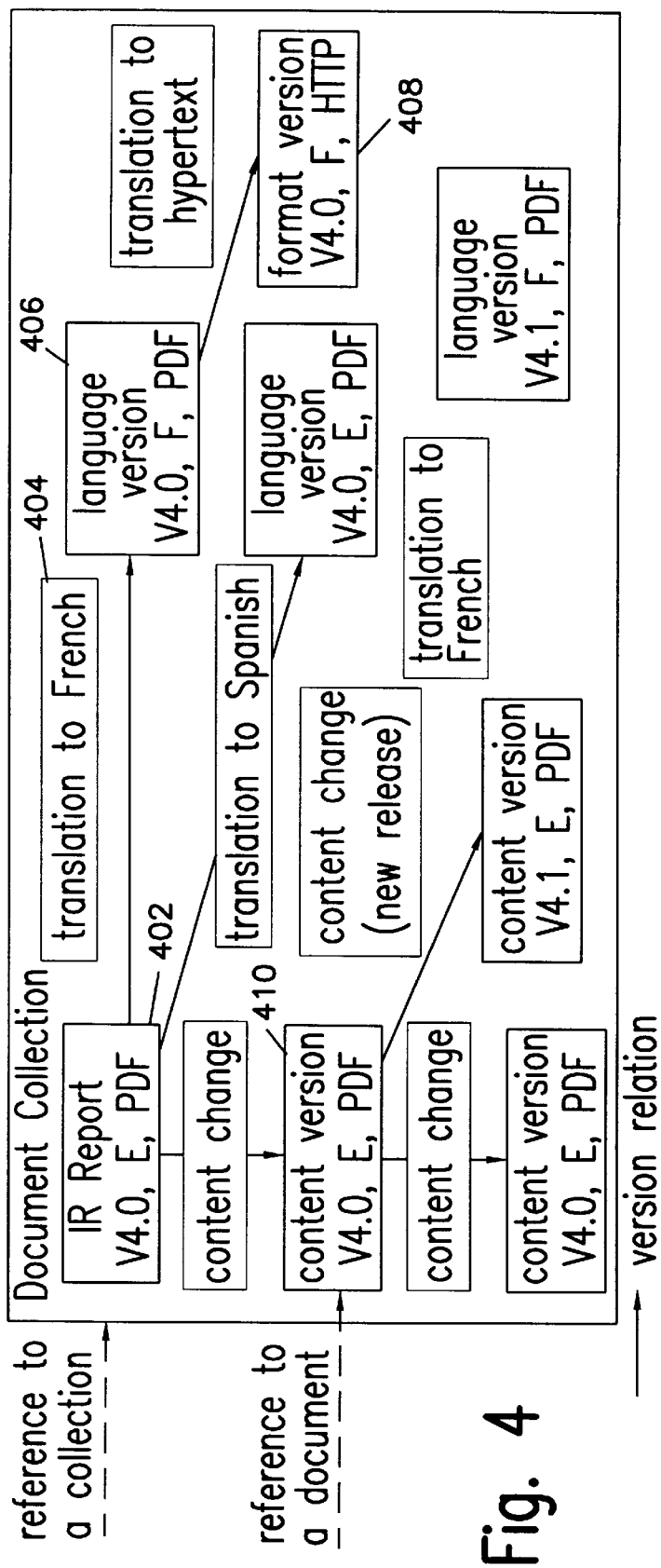
FIG. 4 provides a broad overview of versioning.

FIG. 4 illustrates these concepts. First, there is an original document, the IR Report v4.0, in English and in PDF format 402. Creation 404 of a language version occurs and results in the French version of the IR Report v4.0 in PDF format 406. A further format version is created and results in the French version of the IR Report v4.0 in HTTP format 408. Furthermore, a content version 410 can be created.

Figure 5:
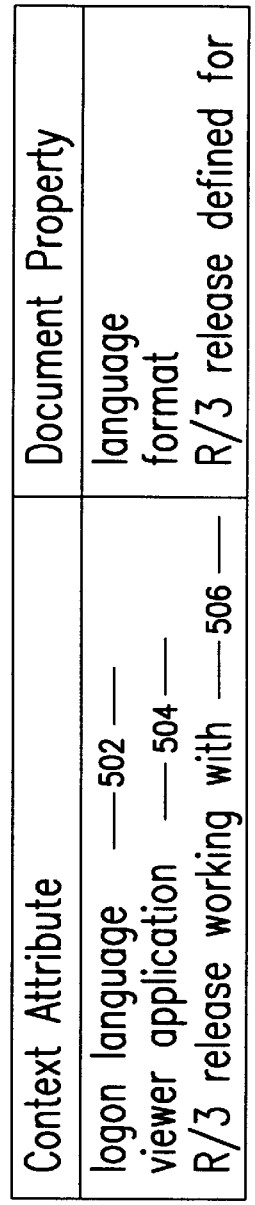
FIG. 5 provides examples of typical context attributes.
Figure 6:
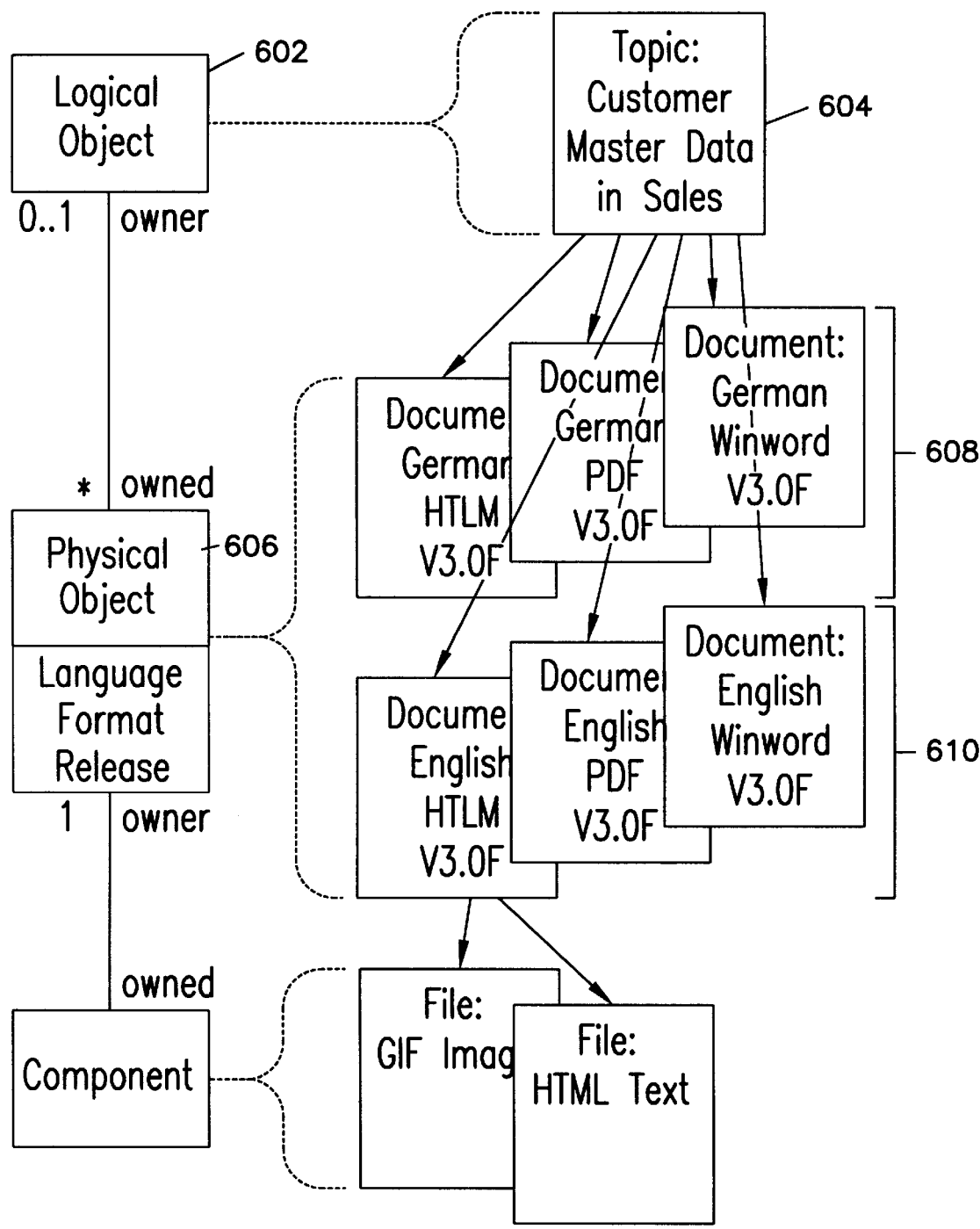
FIG. 6 illustrates the content model in a context resolution setting.

Versioning allows flexibility for users when creating and managing documents. However, these new versions usually create problems for sources that refer to them. A fundamental aspect of the IR Management System is the context resolution system. The notion of versioning as defined above implies that there may be more than one version at a time that is not outdated. A user who is logged on to the 1995 release of the application system in English and has a Web Browser installed as a viewer would typically like to see the English HTML version of the document. The context attributes as shown in FIG. 5 in this case would be logon language 502, viewer application 504, and the release of application 506 itself, which is mapped for use in the context resolution system. FIG. 6 provides an illustration of the content model in the context resolution setting. Logical object 602 in the example of FIG. 6 is the collection of all versions of the "Customer Master Data in Sales" document 604. Physical objects 606 comprise three German files of various formats 608 and three English files of various formats 610. Context resolution calls the appropriate file based on the attributes of the user.

The process of creating these new versions must be centrally managed in a multi-user environment. In order to avoid simultaneous editing of a document resulting in over-writing of changes, the IR system controls all access through IR Content Access agent 118 as shown in FIG. 1A. Every author who intends to change an original must go through this Content Access agent and register himself. The Content Access agent will set up a lock for the original within IR Administration Data 152 that will prevent other users from accessing the document. When the second user tries to perform a check-out, the Content Access agent will check the check-out information and refuse to serve the request. In addition to the administrative data that is maintained by the Content Access agent, the IR system also maintains administrative data on the front end, the local administration data. A list of the documents that are checked out to the front-end, together with the location and IR object ID, are updated each time a document is checked in and checked out. There are two flavors of versioning in the preferred embodiment, strict versioning and versioning with possible update of physical objects. In strict versioning, a document that is once checked-in to the IR document management system cannot be changed, but it can be used to explicitly derive a new version and then work on this version. FIG. 7 is a flowchart describing the strict versioning process. The user desires to make changes to the original document, i.e., to create a new version 702. The IR creates 704 a new physical object with the contents of the original physical object. Check-out 706 of this document to the user occurs unless it is already checked out 708 by a different user. If the document is not checked out, writing 710 of the check-out data in the IR occurs and the files for the document are transferred to the front-end, where writing 712 of the local check out data and the custom properties of the document occurs. When the user has finished working on the document, he triggers check-in 714. The IR again checks the status, because the user could be someone who just created the document on the front-end and now is trying to check it in. It ensures that the document is not yet checked in and that the document is not currently checked out 716. If the check is successful, the document is copied from the front-end to the IR and an update 718 of the global administration data is executed. Finally, a deletion 720 of the local data from the front-end occurs.

Figure 8:
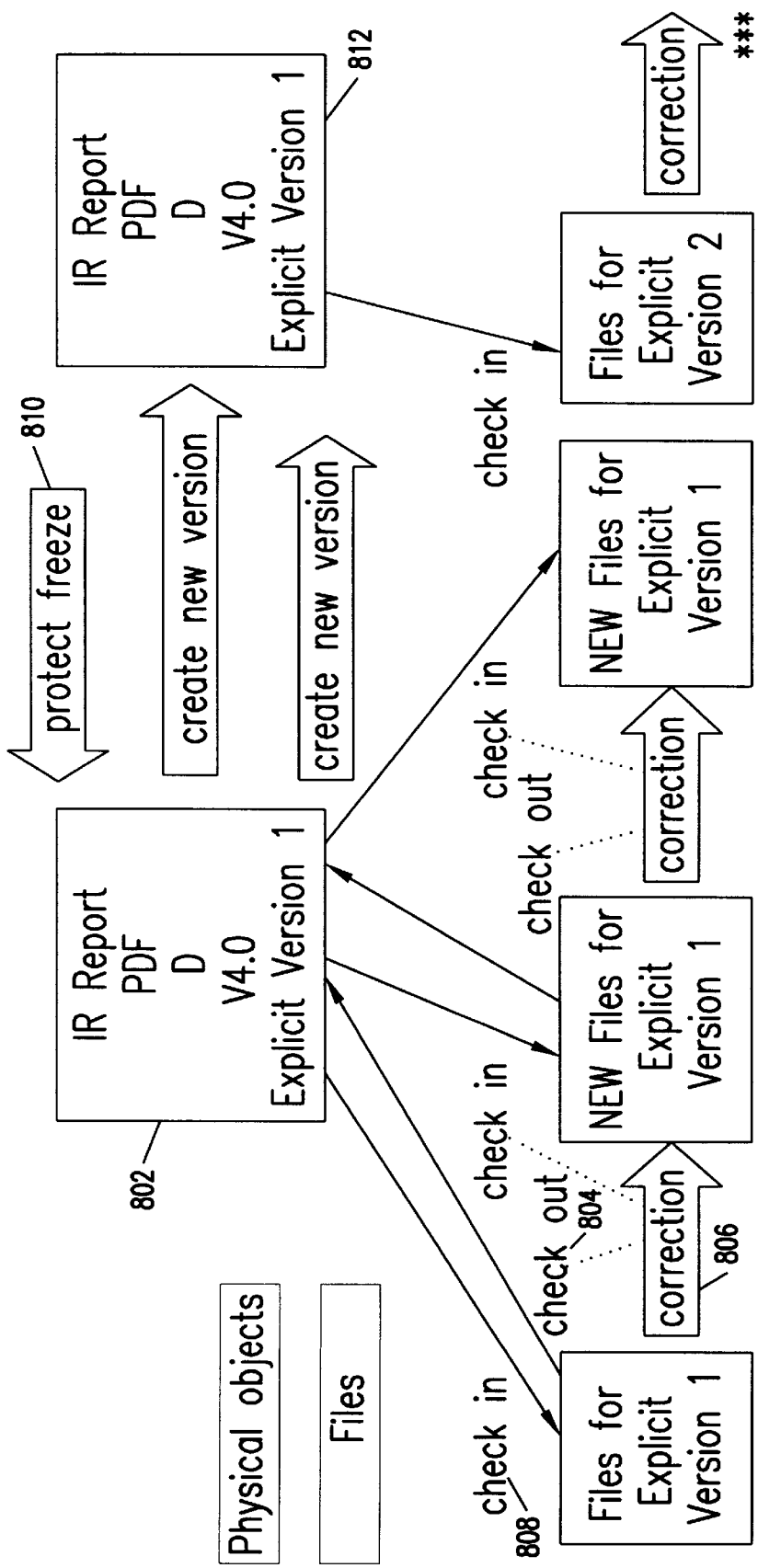
FIG. 8 is a flowchart of versioning with update of physical objects.

Because strict versioning creates a significant amount of overhead for applications whose documents change frequently, the IR system has a second flavor of versioning called "versioning with possible update of physical objects." When a physical object is checked in with this flavor of versioning, the physical object is not forever protected from further changes as in strict versioning. The process of checking a physical object out and in can be repeated an indefinite number of times until the user explicitly decides to "freeze" this version. FIG. 8 illustrates this flavor of versioning. A check-out 804, modification 806, and check in 808 of original document 802 is possible. However, when a freeze 810 is implemented, a new version 812 must be created.

Figure 9:
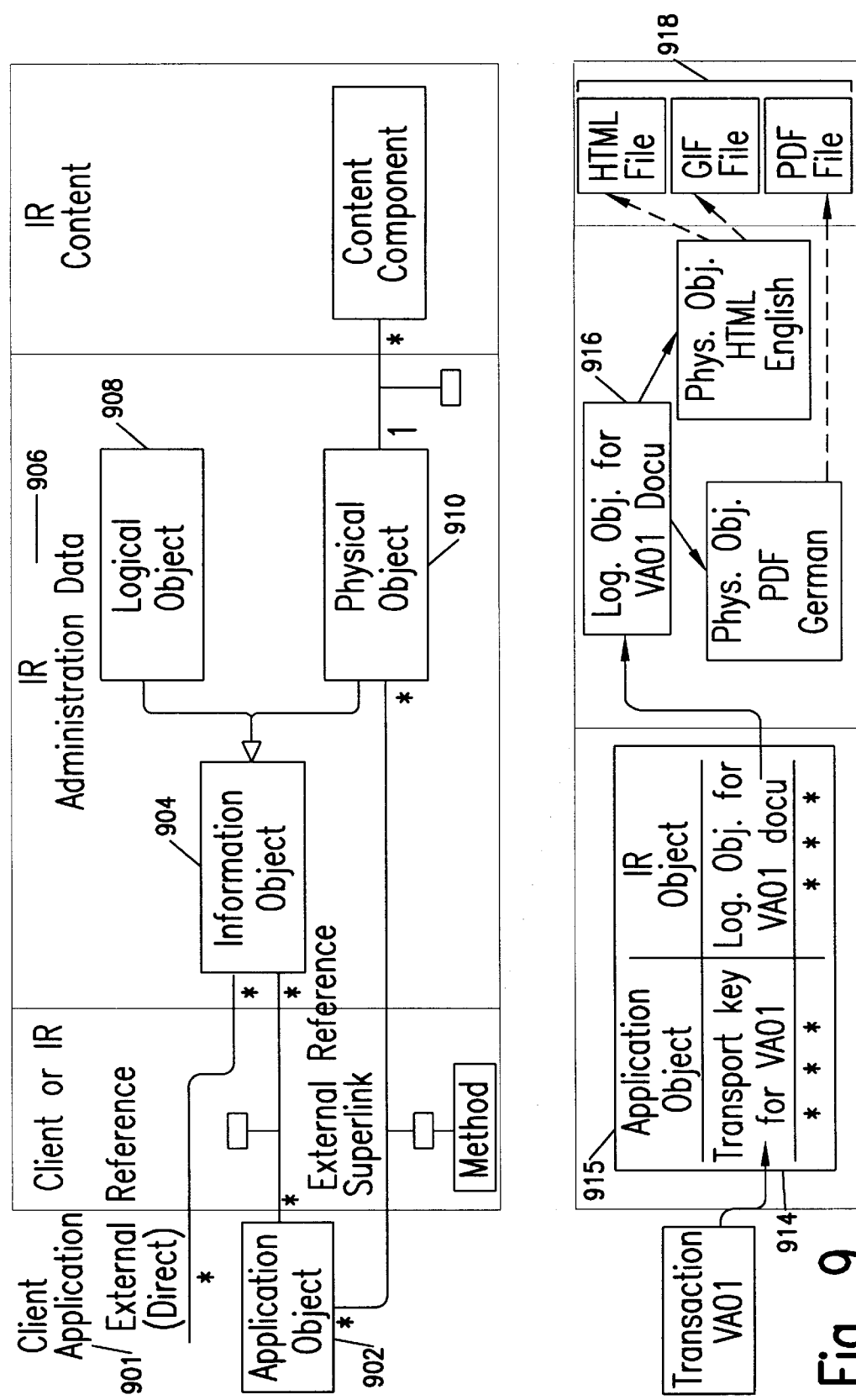
FIG. 9 depicts the external relations model of the IR system.

As all these physical objects are being stored in the IR system, there must be a way for a client application to refer to the information objects (either physical or logical) that have to be retrieved from the IR ("external relations") as shown in FIG. 9. In one embodiment, the client applications maintain the references to the information objects themselves. The client applications directly provide the ID of the information object for requests to the IR system. In the preferred embodiment, there is a mapping between client application objects that refer to IR information objects, and the IR information objects themselves. In this embodiment, a transport key found in R/3 applications (SAP AG) may be used to uniquely identify application objects. There is the application object reference 902 which resides on client application 901. This object refers to information object reference 904 which resides on the IR system in IR Administration Data 906. The information object may be either logical object 908 or physical object 910. Mapping table 912 is stored in the IR itself. The transport key 914 for application object 915 targets logical object 916 on the IR system. The client application 901 simply sends the transport key and the context (logon language, format, etc.) to the IR. The IR then recalls appropriate file 918.

As depicted in FIGS. 1 and 1A, the content of the IR may be distributed among multiple Content Servers as well as the database of the IR system. As noted, it is also possible to use other document servers, like HTTP archives. Users may want to redistribute content among various servers for space or organizational reasons. It is generally more useful to relocate groups of documents that logically belong together rather than relocate single documents. Groups of documents that logically belong together should also not be disrupted through introducing a new document server and checking in all new documents to this server, independent of the logical grouping. Relocating whole groups simplifies administration and improves performance. FIG. 10 illustrates the method of management of file locations in the IR system. Component (i.e. file) 1002 belongs to physical object 1004, which are grouped into a content category (i.e. logical object or collection) 1006, which is located in content repository 1008. The content categories are defined by the client applications. The content category cannot be associated with a logical object, as different versions of physical objects may require different content repositories. The content category acts as a logical description of the document storage locations, a container for documents so that they may be stored or moved to some storage as a whole. The content category refers to the content repository 1008, which describes the physical storage location. If a file system is used as a storage, there will be a root directory that contains the content of content repository 1010. Every physical object refers to components, which represent the actual content, i.e. the file. The locations within the content component records are relative to the location defined by the content repository. When a content category is relocated, the content component records do not need to be changed. File path 1012 depicted in FIG. 10 demonstrates how it is constructed for content repository 1010. In addition to the absolute path for content repository 1010 and the relative path from content component record 1002, an IR object ID is added to the path. As the IR object ID is unique, this avoids naming conflicts that might otherwise occur when identical filenames are chosen for files of different physical objects.

Figure 11:
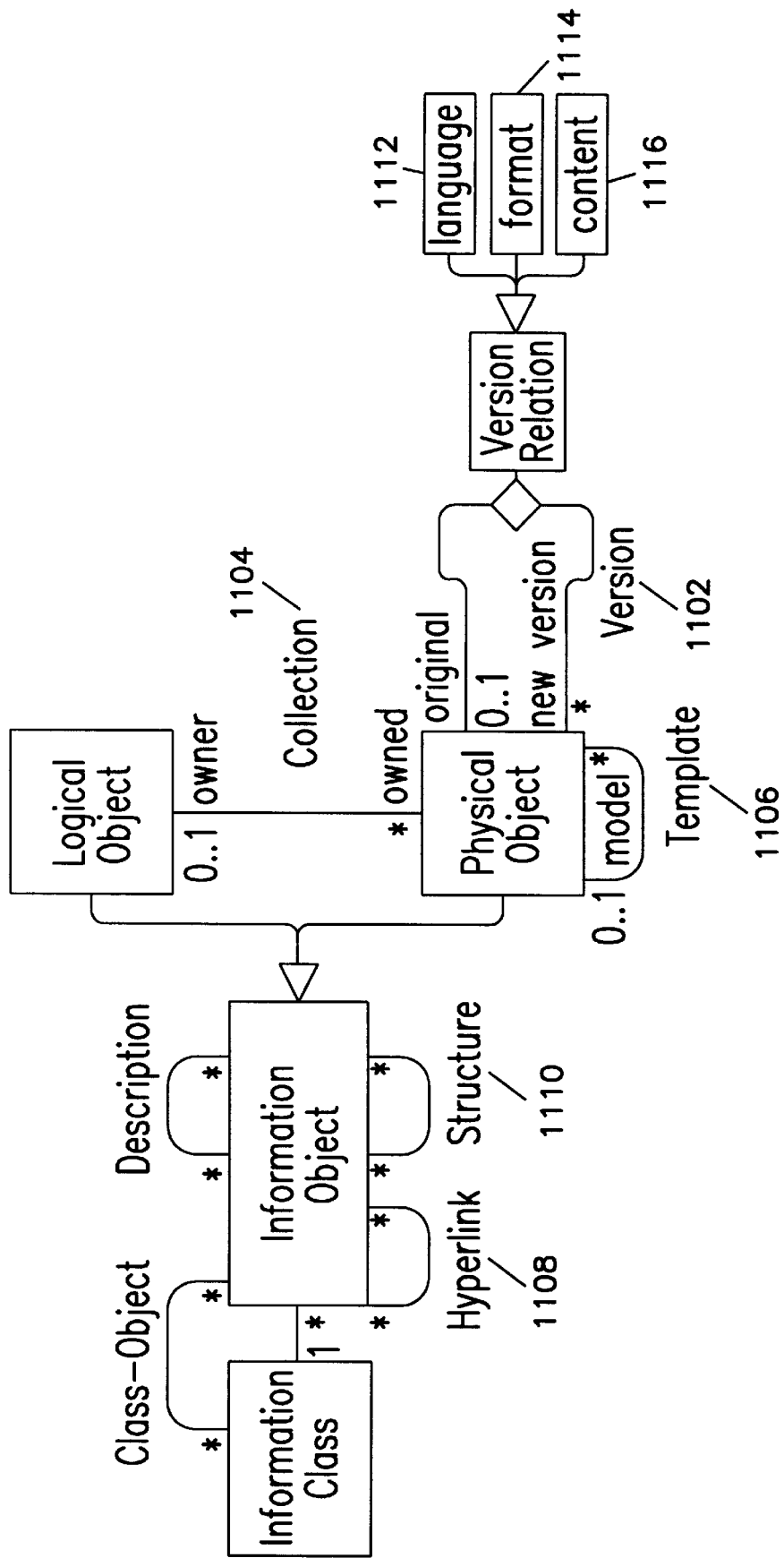
FIG. 11 provides an overview of the predefined classes of IR internal relations of a preferred embodiment.

The term "internal relations," as opposed to the "external relations" described above, designates the relations among objects inside the IR system itself. Internal relations are maintained and retrieved within the central IR Administration Data of the IR System (see FIGS. 1 and 1A). There are different classes of internal relations. FIG. 11 gives an overview of the predefined classes of IR internal relations of the preferred embodiment. There is version relation 1102, collection relation 1104, template relation 1106, hyperlink relation 1108, and structure relation 1110. Each of these will be described in greater detail below. The first is the version relation: one document may be derived from another document as a version of this original document, as noted above. As documents with all the files and data that belong to them are represented by physical objects in the IR, there can be version relations between physical objects. There are different subtypes of version relations that correspond to different functions that can be applied to derive a new version from an original. The user can a) derive a new language version through translation 1112, b) derive a new format version through format conversion 1114, or c) derive a new content version through editing the content 1116. Note that the IR is open for the definition of additional subtypes of version relations for particular client applications. The next relation class, collection relation, has already been defined. The collection relation is a relation between a logical object that models a collection of documents and the physical object that represent a document from this collection. The collection relation is evaluated for context resolution (described below). There are several rules that govern these relations. A document can "belong to" exactly one collection (or not belong to any collection). The logical object that represents the collection can thus be seen as the "owner" of the physical objects in the collection. There can be logical objects that do not own any physical objects (empty collections) or physical objects that are not owned by any logical object (documents not belonging to a collection).

As mentioned above, the notion of a document in the IR is not confined to written content. Documents can also be graphics, recordings, or videos, for example. For these types of documents, it is often useful to have a description document that describes the content of the main document in a textual form. A description relation between two physical objects simply means that one document is the description of the other. It is also possible for a physical object to have a logical object as its description object. If a picture has text in it and is itself language dependent, it is useful to establish a description relation directly between logical objects. The context resolution mechanisms (described below) can then pick the document that best fits to the context out of both collections.

The IR system also includes a template relation so that users that frequently create documents of a particular type can start at a common starting point for the creation process. For that purpose, a physical object can be created to serve as a template for other physical objects. When a client creates a new physical object, it issues a request to the IR to create an initial physical object as a version of another physical object. When a template physical object is provided, the IR system automatically creates a template relation between the new physical object and the one that serves as a template.

Finally, hyperlinks relations are provided. Hyperlinks commonly are a universal means to navigate from a position within one document file to a position in another document file. If the position within a destination is not specified, this usually means that the destination is the beginning of the destination file. Navigation from the source that contains the hyperlink to its destination can be triggered through simply clicking onto the hyperlink representation within the source. As pointed out earlier, when versioning of documents is introduced into a scenario, the hyperlink management suddenly becomes a very complicated process. As such, the goal of this invention is to introduce logical hyperlinks. That is, hyperlink references should point to logical destinations rather than to physical ones in order to enable context resolution when the hyperlink is followed. This provides the advantage that the hyperlink will not have to be changed when a new version is added to a collection—the context resolution will automatically pick the new version when suitable.

Figure 12:
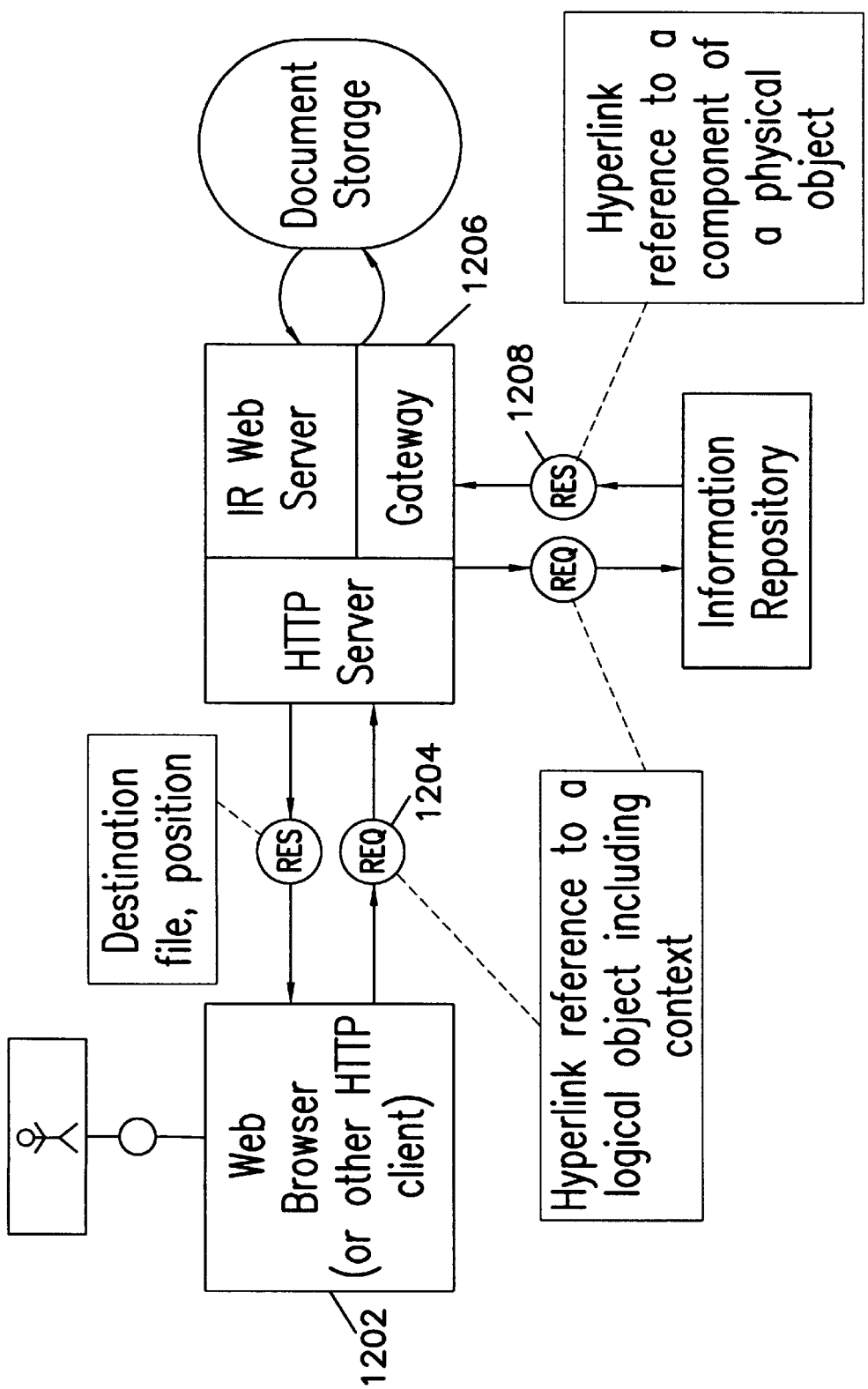
FIG. 12 provides an overview of IR hyperlink resolution.

FIG. 12 gives an overview of the IR hyperlinking system. In order to enable this function, hyperlink references within documents in the IR system do not directly contain a file Uniform Resource Locator (URL). They contain a reference to a logical object instead. When the user activates the hyperlink, a transfer 1204 of this reference to IR Web Server 1202 together with the context parameters of client application is executed. However, as standard Web Servers would not be able to resolve these references, the IR hyperlinks are passed to an extension application that acts as gateway 1206 to the IR system. The IR system performs context resolution and resolves IR hyperlink 1208 to a reference to the file of the physical object that is most appropriate. The return reference may further include a tag ID if the logical object that was resolved represented a position within a component rather than a component itself. The gateway is implemented through Active Server Pages (ASP); consequently, the IR hyperlink references are references to ASP applications instead of file references.

Figure 13:
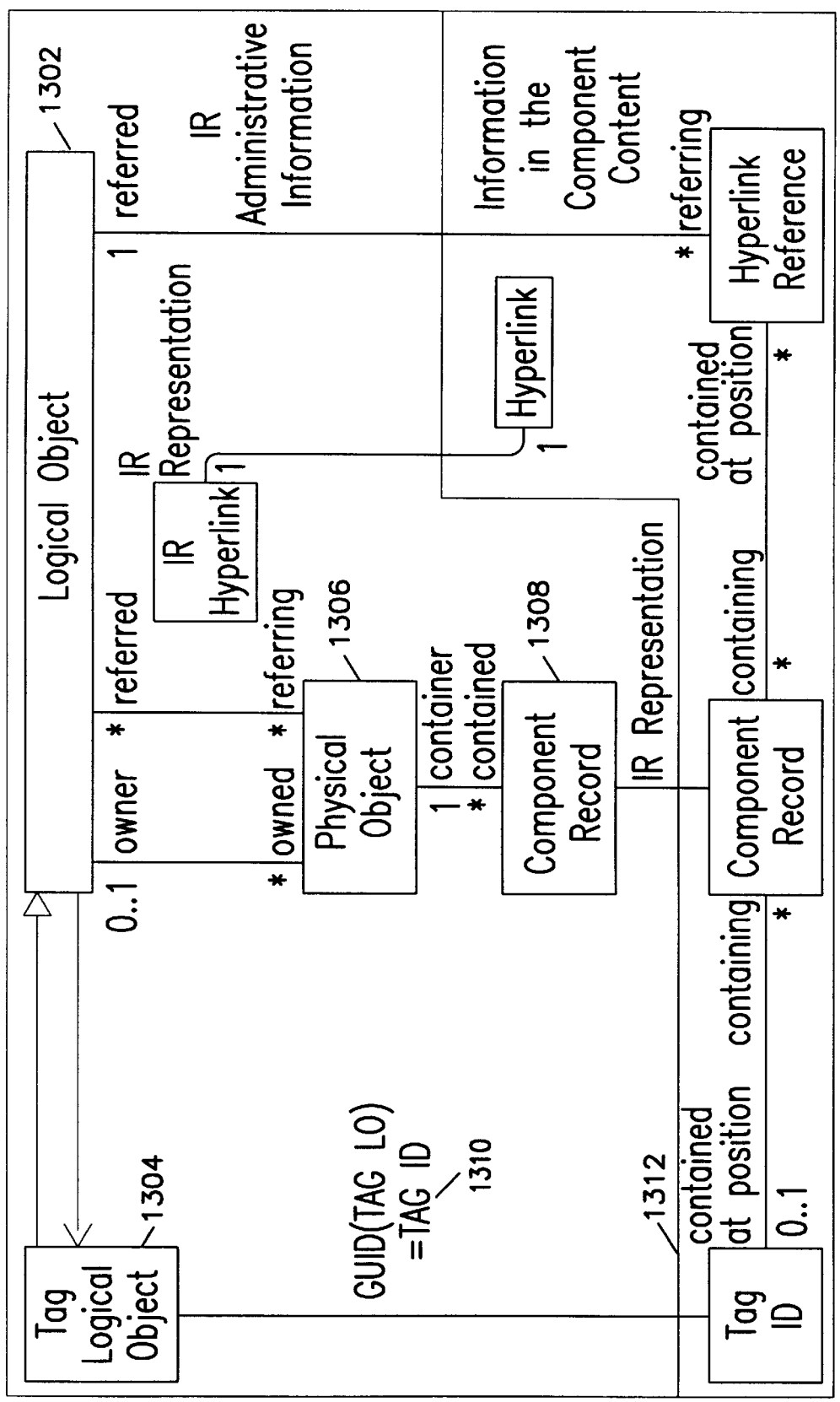
FIG. 13 depicts the data model for the hyperlink mechanism.

As depicted in FIG. 13, an IR hyperlink reference contained at a position in a content component, the document itself, refers to logical object 1302. There is a particular subclass of logical objects named Tag Logical Objects 1304. These objects represent a particular position within one or more content components. If an IR hyperlink reference refers to a usual logical object, the context resolution mechanism simply returns the URL of the suitable document file. If physical object 1306 consists of multiple content components 1308, the URL for a top level content component_can be directly resolved by the Web server (e.g., references to GIF images). If the IR hyperlink refers to a tag logical object, GUID 1310 of the logical object is added as tag value to the URL that is returned. Thus, when an IR hyperlink reference to a position in a document is to be added, the corresponding tag logical object must first be created in the IR, and then its GUID can be inserted into the source document as tag 1312.

The hyperlink relation is also maintained between the physical object and the corresponding logical object in the IR system. This hyperlink relation represents the hyperlink that is contained in the source content component. Furthermore, the IR system provides a service on the front-end to scan HTTP files and extract the IR hyperlinks from them. The IR system will automatically maintain the result of the scan on the front-end and use this information to write the hyperlink references to IR administration data 114 when the corresponding document is checked in.

Structure relation is the final relation provided for in the IR system. One typical way of retrieving a particular document is to drill down in a hierarchical structure, as in a file system or library. The user can go to the section where a collection resides, and locate all the books in that collection. This type of relation is provided in the IR system to enable client applications to build such hierarchical structures where the documents can be sorted and later retrieved.

Figure 14:
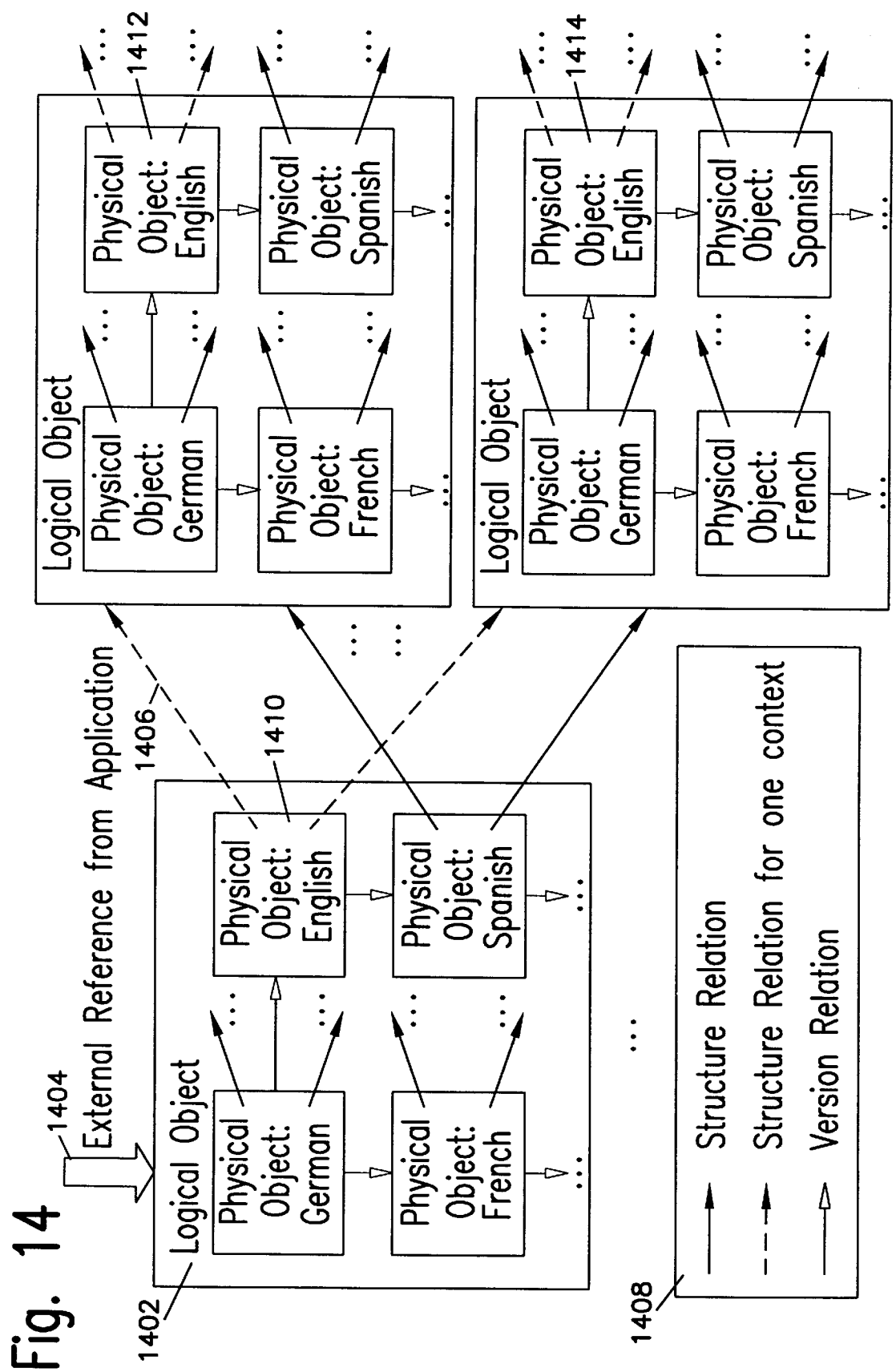
FIG. 14 provides an overview of the structure relation concept.

FIG. 14 depicts the structure relation concept. The collection relation is modeled as physical objects being contained within the collection for logical object 1402. At least one root logical object must be referenced by client application 1404. Physical objects may have structure relations to logical objects 1406, this way, multiple levels of nested structures may be built. One user usually works with fixed context 1408. In FIG. 14, all contexts but language have been neglected for illustrative purposes. First English physical object 1410 is structurally related to second English physical object 1412 and third English physical object 1414 that are nested within the lower level logical objects.

Figure 16:
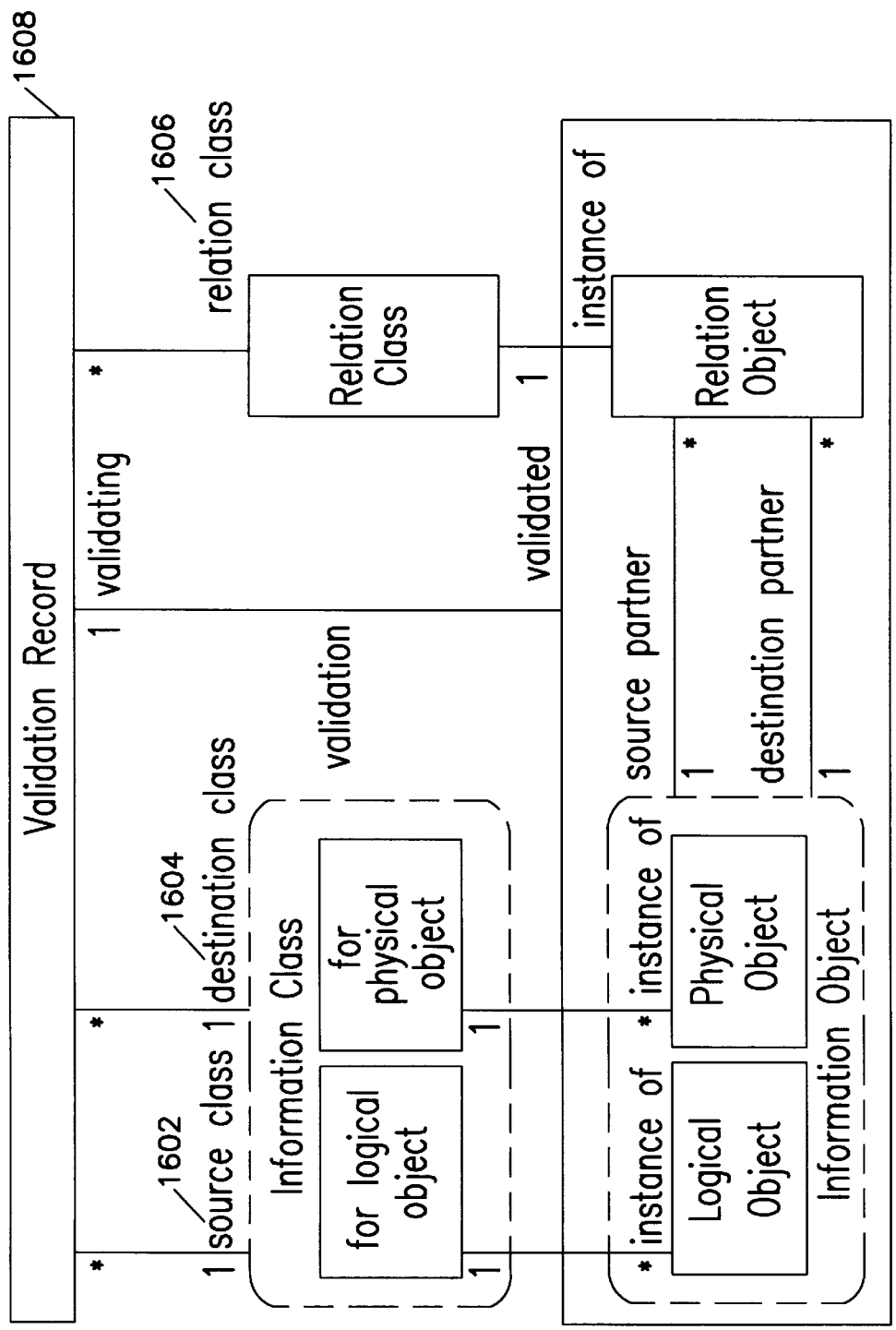
FIG. 16 depicts the validation process.

The types of relations introduced above are not always sufficient for all user applications. An application may want to introduce the notion, for example, of shelves and folders containing documents. While shelves could contain folders, they could not directly contain documents. Thus, a mechanism is required for applications to define their own particular classes of relations, and classes of information objects as well. For every new relation class, it must also assign a relationship type to this relation class as shown in FIG. 15. The relationship type of a relation class defines the transport characteristics and the existential dependence with respect to relation partners. Furthermore, before an application can make use of a new relation class, it must define with information classes can participate in the relation as depicted in FIG. 16. For this purpose, multiple validation records are defined, where each one validates a combination of one source information class 1602, one destination information class 1604, and one relation class 1606. Every structure of two information objects and one relation object that forms a relation is validated by exactly one validation record 1608. Whether a relation class is allowed or not is always defined in terms of information.

Figure 17:
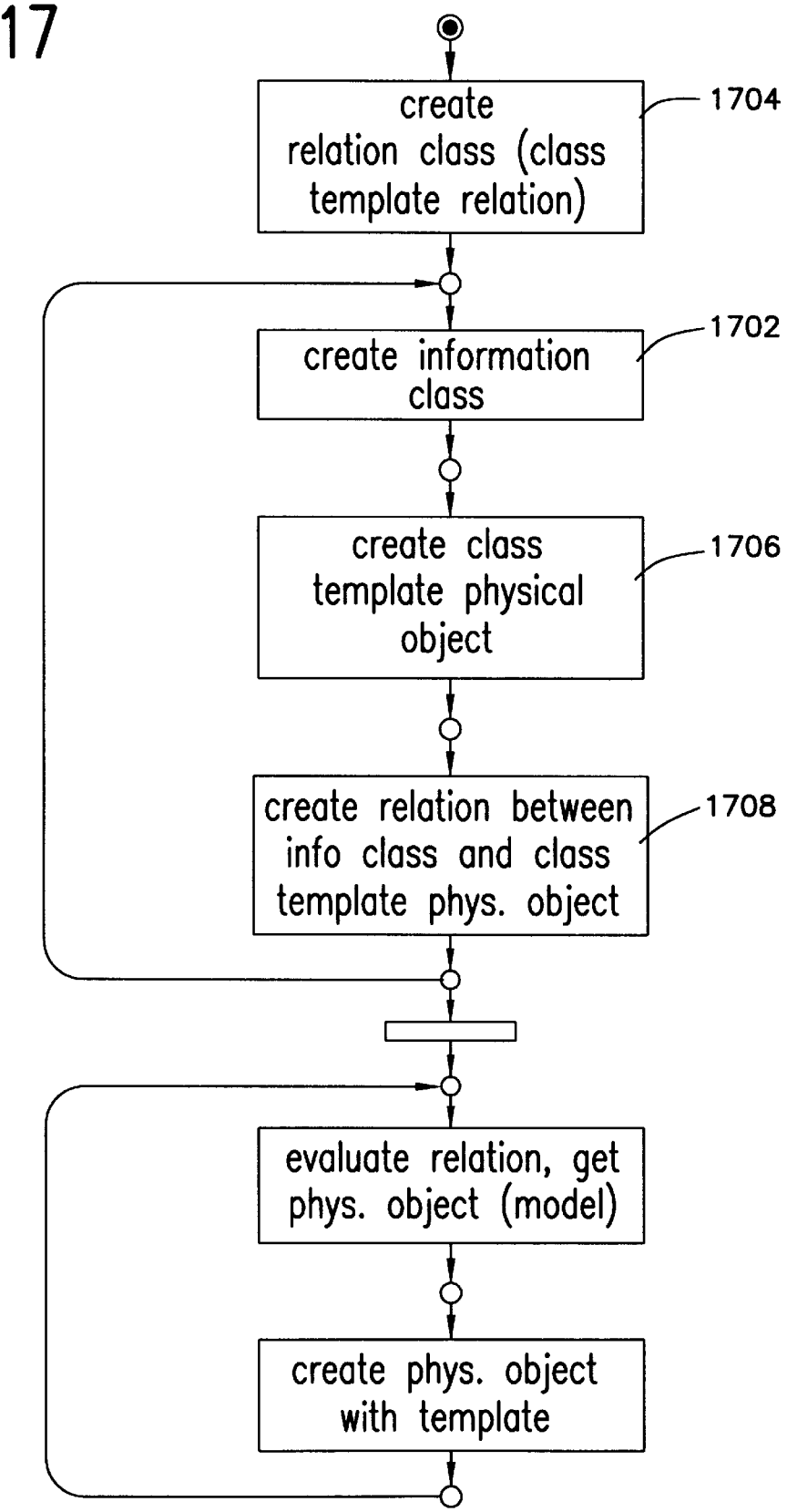
FIG. 17 is a flowchart of the typical sequence of actions for template relation.

For relations between information classes and object, an additional relationship type has been introduced, such that applications can flexibly introduce relation classes for relations between information classes and information objects as shown in FIG. 17. A class-object relation could, for example, be used in conjunction with the template relation class. A client application could introduce a particular information class 1702 for physical objects named "Modeling Report." An information class groups all documents that should be treated in a common specific manner. In this example, the common characteristic would be that the documents would initially be created from the same template. The client application would then introduce a relation class with the relationship type class-object that could be named "Class Template Relation" 1704. Corresponding relation 1708 is be set up between the information class 1702 "Modeling Report" and an information object serving as class template 1706 for the information class.

Figure 18:
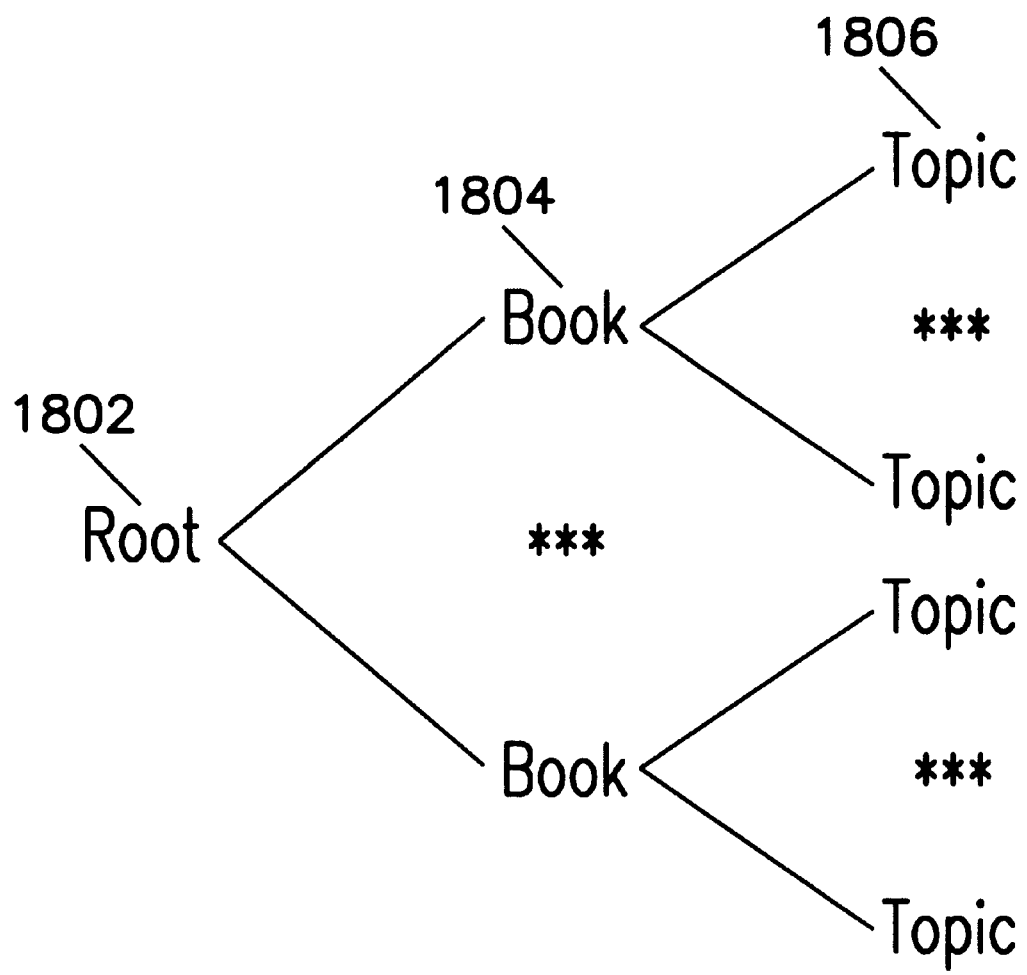
FIG. 18 is an example of a data model to be used in the IR system for structure relations.

As an illustrative example, a data model with information classes and relation classes is provided. Every new client application that needs to access the IR system should first design its specific data model. FIG. 18 depicts the structure of the information that is modeled through structure relations in the IR system. The IR contains "Root" physical object 1802 and "Book" physical and logical objects 1804. For Books and Topics 1806, both physical and logical objects are introduced because both are versioned. FIG. 19 illustrates a conventional data model. Separate information classes have been introduced for the different formats of the physical objects for topics. That way, it can be modeled that HTML documents are always derived from WORD documents. The predefined relations classes collection, hyperlink, structure, language, format and content are used. For the predefined relation classes, the example data model defines the information classes that can participate as a source or as a destination in a relation of the corresponding class. For example, information class IWB_SRCTXT 1902 can occur as the source of a format version relation while information class IWB_DSTTXT 1904 occurs as a destination. There are particular versions of the topics in the example data model. As these versions are set out to be content versions, it is not necessary to introduce application specific relation classes. The corresponding relations are instead modeled as content relations where the destination object has a particular attribute that designates it as a content version.

Figure 20:
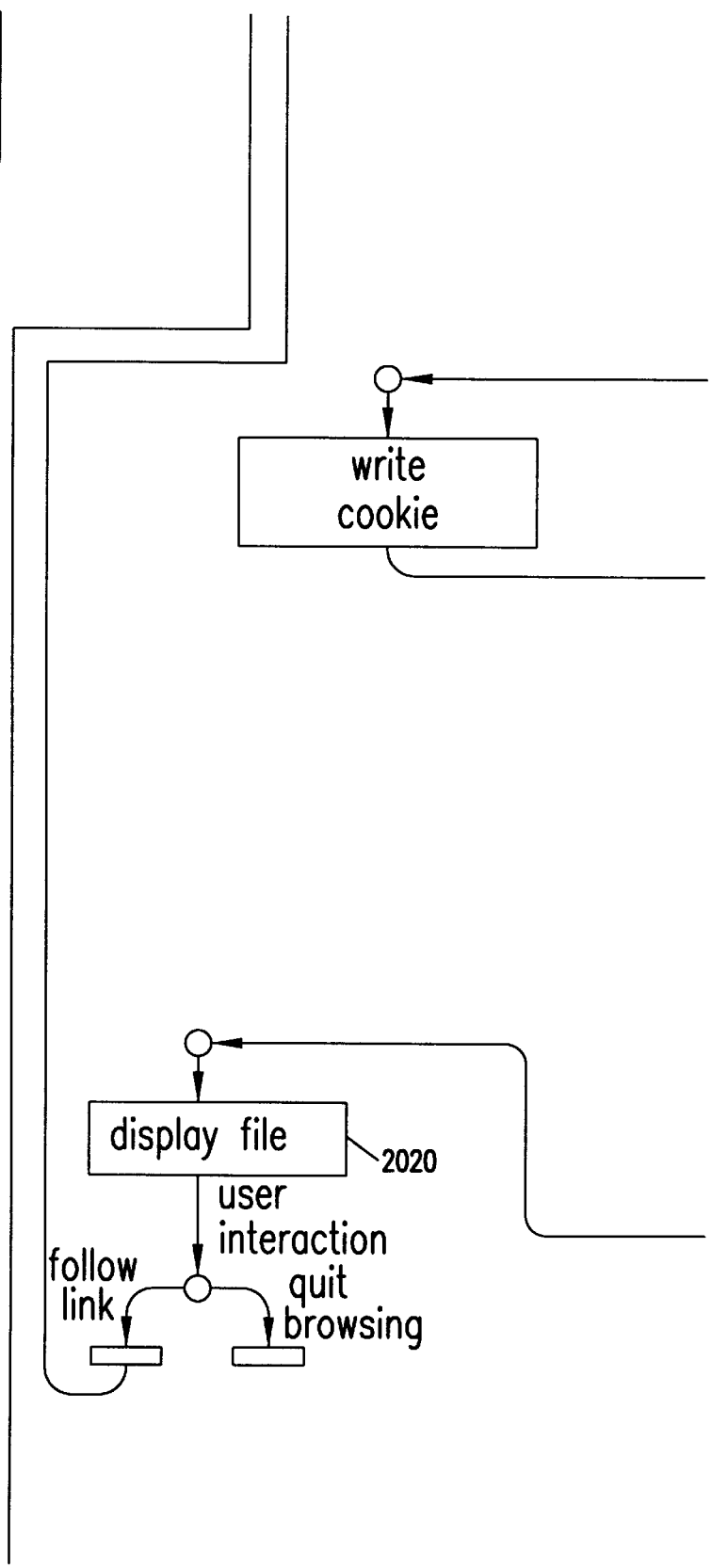
FIG. 20 is a flowchart illustrating the communication of components in a browsing scenario.

In the next sections, a scenario is described to further illustrate the workings of the present invention. The purpose of this section is to give an overview of how the components work in principle together before presenting more internal details and details on interfaces. In this scenario, the user of the IR system views content through a Web browser. In order to do so, an IR URL is required as a starting point. For displaying content, the IR offers a particular service that constructs an IR URL from an object ID and context 2002, as shown in FIG. 20. The object ID can either be the ID of an application object that is linked to an IR object or the GUID of an IR object. The Browser Caller provides a service so that a client application can view the content for URL's on front end 2004. Next, the Web browser issues HTTP request 2006 to HTTP server 2008. Every IR URL is passed to IR Gateway 2010 for further processing. In case of a request triggered from the application system, the context is coded into the IR URL and the IR Gateway will extract context 2012 and tell the HTTP server to store it within a cookie on client side 2014. The IR Gateway also extracts the Object ID from URL 2016. Subsequently, it asks the IR Management Agent to resolve the object ID. This step involves context resolution. It may also involve checking access rights. Transfer 2018 of the file to the browser by the HTTP server occurs. Then the browser executes display 2020 of the file.

Figure 22:
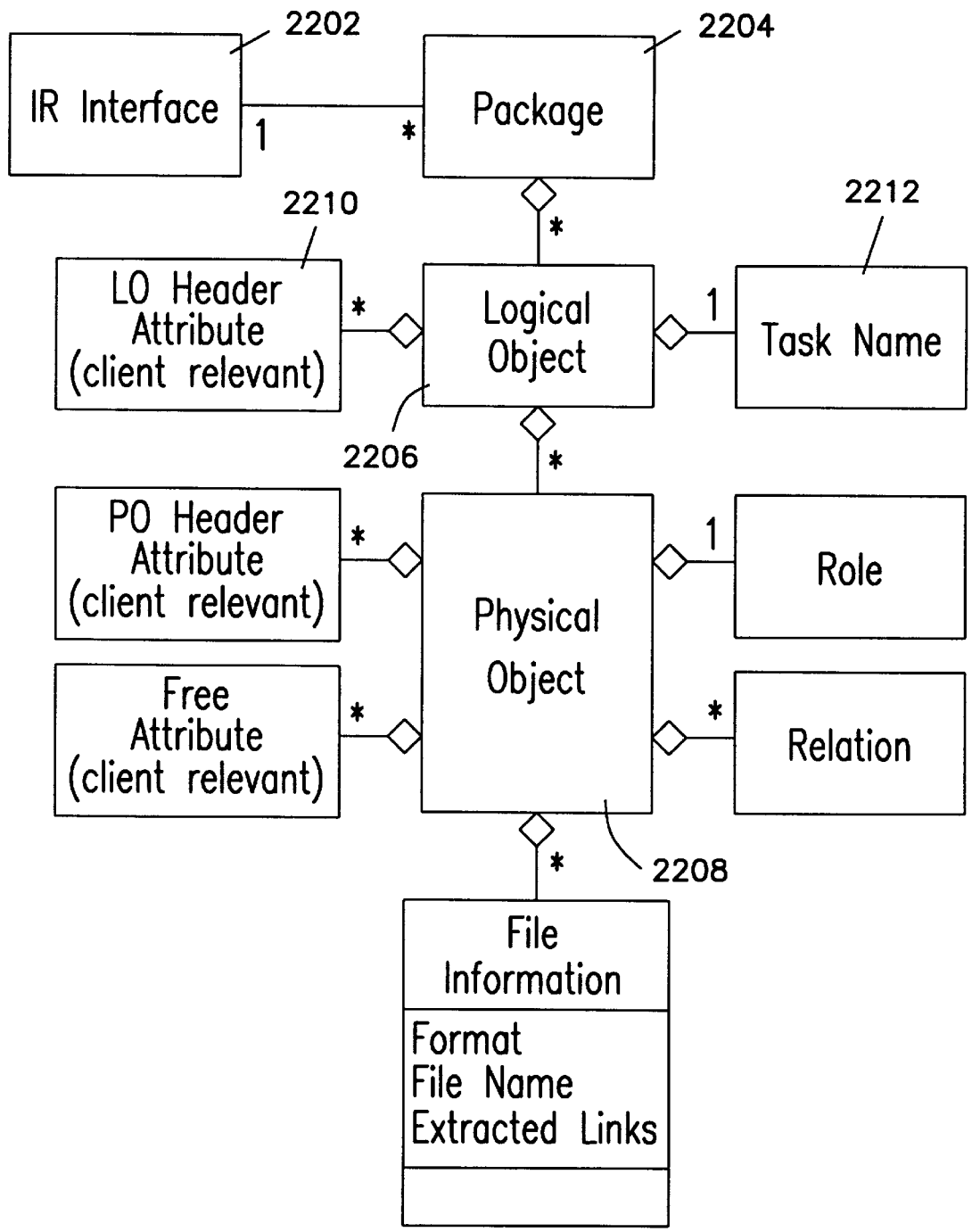
FIG. 22 depicts an object model for R3L objects.

In the Check-out/Edit scenario, additional components are required on the front end, whereas in the previous browsing scenario, only standard components were required. FIG. 21 illustrates the components necessary for this scenario. The components on the front-end are divided into components that are directly accessed by the end user and other components, most of which provide IR functionality on the front-end. An editor application is shown on the left hand side of the figure; in this case, it is MS Word 2102. IR Controller 2104 provides the interface to the IR system on the front-end and offers service functions for the access and administration of IR objects on the front-end. It enables client applications and their respective editor applications to work with IR objects off-line. The IR Controller shares administrative data on the front-end with other IR front-end components such as IR CiCo 2106 and HTML parser 2108. The administrative data is stored in what is called "R3L-Objects." One R3L Object corresponds to one file that contains administrative data for a logical object and the contained physical object on the front-end. The data contained within the R3L Object is accessible for the editor application through a corresponding object model represented at the client interface to the IR Controller as depicted in FIG. 22. All the administrative data on the front-end is accessed through IR Interface Object 2202 implemented by the IR Controller. The IR Interface Object refers to one or more packages 2204. A package is a grouping of objects defined by the client application when the objects are checked out or copied to the front-end for a common purpose. Package 2204 contains multiple logical 2206 and physical 2208 IR objects. For each logical object, the properties that have been marked as client relevant 2210 in the IR administration data are stored. Task name 2212 and the physical objects that are relevant for the task are stored. All the data maintained for a physical object is written to the central IR administration data when the physical object is checked out. Data for logical objects cannot be modified on the front-end. In FIG. 21, editor driver 2110 is the optional connective software component for interfacing front-end applications to the IR Controller. A corresponding component is required for applications that cannot directly make use of the IR Controller interface for technical reasons. HTML parser 2108 parses documents into HTML format and extracts the links and tags embedded in them. The corresponding relation information is stored with the R3L Objects and written to the central IR administration upon check-in. IR CiCo (Check-in/Check-out) 2106 component can be asked to check documents out of or into the IR system. It is also responsible to transfer the information that is stored in the R3L objects out of/in to the central IR administration data. Property OCX 2112 is used to store information within the documents that support structured storage. Information is written to the custom properties of a document. For example, information that identifies a document is written here before it is given to an external translator. This enables automatic subsequent check-in of the document under the correct identity. There may be multiple converters 2118 on the front-end that are specific for a particular client application. They are not standard IR components. They perform a conversion between the format of the corresponding standard editor and an internal format defined by the client application.

FIG. 23 provides an overview of the communication between the components that occurs when a document is checked out. The IR Controller performs the following steps. A selection 2302 regarding which one (or more) logical objects should be checked out. A request 2304 is sent to the IR Management Agent 120 for corresponding physical objects via IR BAPIs and IR Manager Proxy 144. A selection 2306 of physical objects that need to be checked-out occurs. Finally, a check 2308 is performed regarding the status of objects to be checked out via IR BAPI. Then, the creation 2310 of one folder for each physical object that is to be checked out is executed by the IR CiCo. After this, a request 2312 is sent to the IR Management Agent 120 to perform the Checkout—for each physical object individually. The IR Manager checks the access rights, retrieves the locations and triggers a BAPI on the application to perform transfer 2314 of files to the front-end. If any error occurs with any file that belongs to one physical object, IR CiCo will receive a return code 1414 that indicates that the whole physical object could not be checked out. After the successful checkout of a physical object, the IR Controller writes information such as the object ID into the custom properties of the Property OCX. Finally, the IR Controller calls suitable editor application 2318 (in this case MS WORD).

With regard to a check-in scenario, it is the same as the check-out scenario except the files are transmitted in the reverse order, the Property OCX reads and deletes the document properties before the file transmission and the files on the front-end are deleted after successful check-in.

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An information repository system for managing, storing and retrieving a computer data file comprising:

a content server for storing said file;

content model means for defining a three-tiered content model which comprises nested tiers including component classes, physical object classes, and relations classes, and wherein a logical object contains a reference to said file and describes said file in generic terms and with reference to at least one attribute, and further wherein said logical object contains a reference to at least one physical object associated with said logical object, and contains a reference to at least one component associated with said at least one physical object, and wherein relations from said relations classes are used to connect logical objects and physical objects with other logical objects or physical objects;

an administration data table which contains administration data associated with physical objects;

logical hyperlink means for resolving, in context-based indirect runtime resolution, the logical object, to a physical destination of the file associated with the at least one physical object associated with the logical object;

context resolution means, enabled by said logical hyperlink means, for context-based resolution of a particular physical object associated with the logical object on the basis of the context attributes of a request as determined by correlating requested context attributes against attributes of physical objects associated with the logical object and attributes of a front-end client application; and a management agent for managing said logical objects and physical objects using said content model means in conformance with said administration data and for identifying and retrieving the physical object resolved via said logical hyperlink means and said context resolution means.

2. The system of claim 1 wherein a class of logical objects is defined with application-specific attributes.

3. The system of claim 1 wherein said physical object classes are defined with application-specific attributes.

4. The system of claim 1 wherein said component classes are defined with application-specific attributes.

5. The system of claim 1 wherein said relations classes are application-specific and are defined with application-specific attributes.

6. The system of claim 1 wherein said at least one attribute is application-specific.

7. The system of claim 1 wherein said context attributes utilize versioning based on changes in content.

8. The system of claim 1 wherein said context attributes utilize versioning based on changes in language.

9. The system of claim 1 wherein said context attributes utilize versioning based on changes in format.

10. The system of claim 1 further comprising another administration data table which contains administration data associated with said logical object.

11. The system of claim 1 further comprising another administration data table which contains administration data associated with said at least one component.

12. The system of claim 1 further comprising another administration data table which contains administration data associated with said relations.

13. The system of claim 1 wherein the context attributes include user's current language.

14. The system of claim 1 wherein the context attributes include format.

15. The system of claim 1 wherein the context attributes include content version.

16. The system of claim 1 wherein said context attributes include criteria, rules or information that is application specific to said front-end client application.

17. The system of claim 1 wherein said context attributes include criteria, rules or information that is user-defined.

18. The system of claim 1 wherein the content server is a web-based document server.

19. The system of claim 18 wherein the content server means and the management agent are integrated with said front-end client application through at least one business application programming interface.

20. The system of claim 1 further comprising content access means to maintain inter-physical object relations and to prevent the simultaneous editing of a physical object by multiple users.

21. The system of claim 20 wherein the content access means is implemented as a check-out/check-in mechanism where, when an original physical object is checked-out by a first user, said management agent locks the original physical object via said administration data table by setting checkout information to prevent a subsequent user from accessing the original physical object.

22. The system of claim 21 wherein the content access means permits multiple physical object versioning with possible updates of said physical objects.

23. A method for managing, storing and retrieving a computer data file comprising the steps of:
providing said file;
defining a three-tiered content model which comprises nested tiers including component classes, physical object classes, and relations classes, and wherein a logical object contains a reference to said file and describes said file in generic terms and with reference to at least one attribute, and further wherein said logical object contains a reference to at least one physical object associated with said logical object, and contains a reference to at least one component associated with said at least one physical object, and wherein relations from said relations classes are used to connect logical objects and physical objects with other logical objects or physical objects;
defining administration data associated with physical objects;
targeting the logical object with context attributes;
resolving, in context-based resolution, a particular physical object associated with the logical object on the basis of the context attributes of a request as determined by correlating requested context attributes against attributes of physical objects associated with the logical object and attributes of a front-end client application;
enabling said step of resolving by resolving indirectly in runtime, via context-based indirect runtime resolution, the logical object to a physical destination of the file associated with the at least one physical object associated with the logical object;
identifying the particular physical object so resolved by context based resolution; and
managing said resolved object using said three-tier content model in conformance with said administration data.

24. The method of claim 23 further including the step of retrieving said identified physical object.

25. The method of claim 23 wherein said context attributes include particular attributes of user's current language, format or front-end client application.

26. The method of claim 25 wherein said context attributes further include rules or information that is application specific to said front-end client application or user defined.

27. The method of claim 23 further including the step of preventing the simultaneous editing of an object by multiple users by, when an original physical object is checked-out by a first user, locking the original physical object via said administration data table by setting checkout information to prevent a subsequent user from accessing the original physical object.

28. The method of claim 27 wherein the step of managing said resolved objects includes the steps of:
forming a content component record from said components;
defining an absolute path in a content repository, said repository containing at least one content category which provides a logical description of the physical storage location of said file and refers to the content repository;
grouping said files into said content category;
defining a path relative to the absolute path based on said content component record;
creating a unique object ID; and
defining the file location by combining said absolute path, said relative path and said unique object ID.

29. The method of claim 23 wherein the step of managing said resolved objects includes the steps of:
forming a content component record from said components;
defining an absolute path in a content repository, said content repository containing at least one content category which provides a logical description of the physical storage location of said file and refers to the content repository;
grouping said plurality of files into said content category;
defining a path relative to the absolute path based on said content component record;
creating a unique object ID; and
defining the location of the file by combining said absolute path, said relative path and said unique object ID.

30. A method for defining and managing a file stored at a physical storage location, which method allows identical filenames for a plurality of files of different physical objects and comprises the steps of:

creating at least one physical object which refers to components which represent the file, said components forming a content component record;

defining an absolute path in a content repository, said content repository containing at least one content category which provides a logical description of the physical file storage location and refers to the content repository;

grouping said plurality of files into said content category;

defining a path relative to the absolute path based on said content component record;

creating a unique object ID; and defining the location of the file by combining said absolute path, said relative path and said unique object ID.

* * * * *